US012296610B2

(12) United States Patent
Campbell et al.

(10) Patent No.: US 12,296,610 B2
(45) Date of Patent: *May 13, 2025

(54) HEAT PRESS

(71) Applicant: Cricut, Inc., South Jordan, UT (US)

(72) Inventors: Vance Campbell, South Jordan, UT (US); Thomas Crisp, Cottonwood Heights, UT (US); Jeremy B. Crystal, Springville, UT (US); Del Ray Doty, Carlsbad, CA (US); Francois Laine, Walnut Creek, CA (US); Ryun Bates Noble, Salt Lake City, UT (US); Bradley Carroll Rice, Carlsbad, CA (US); Grayson Stopp, San Francisco, CA (US); Giacomo Michael Pasquale Strollo, San Diego, CA (US); Zhian Wang, Holladay, UT (US)

(73) Assignee: Cricut, Inc., South Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/441,896

(22) Filed: Feb. 14, 2024

(65) Prior Publication Data

US 2024/0227426 A1 Jul. 11, 2024

Related U.S. Application Data

(63) Continuation of application No. 18/260,202, filed as application No. PCT/US2022/014117 on Jan. 27, 2022.

(Continued)

(51) Int. Cl.
*B41M 5/26* (2006.01)
*B30B 15/06* (2006.01)
(Continued)

(52) U.S. Cl.
CPC ............ *B41M 5/26* (2013.01); *B30B 15/064* (2013.01); *B30B 15/34* (2013.01); *B32B 37/06* (2013.01)

(58) Field of Classification Search
CPC ........ B41M 5/26; B30B 15/064; B30B 15/34; B32B 37/06
See application file for complete search history.

(56) References Cited

U.S. PATENT DOCUMENTS 3,979,248 A 9/1976 Kussmaul
4,852,486 A 8/1989 Ely
(Continued)

FOREIGN PATENT DOCUMENTS

CN 107878013 A 4/2018
CN 108437613 A 8/2018
(Continued)

OTHER PUBLICATIONS

International Search Report and Written Opinion for International Application No. PCT/US2022/014117, mailed May 18, 2022, 8 pages.

*Primary Examiner* — David H Banh

(57) ABSTRACT

A heat press may include an upper assembly comprising a heat plate, a lower assembly comprising a platen, and a base assembly interconnecting the upper assembly and the lower assembly. The base assembly may include a drive motor that is configured to drive movement of the upper assembly relative to the lower assembly. The heat press is generally configured to heat and compress, between the heat plate and the platen, a workpiece. A method for a heat press may also include a processor perform various operations, including activating a drive motor to drive an upper assembly of a heat press toward a lower assembly of the heat press to exert a compressive force on a workpiece disposed between a heat (Continued)

plate of the upper assembly and a platen of the lower assembly.

20 Claims, 22 Drawing Sheets

Related U.S. Application Data

(60) Provisional application No. 63/142,490, filed on Jan. 27, 2021.

(51) Int. Cl.
  *B30B 15/34* (2006.01)
  *B32B 37/06* (2006.01)

(56) References Cited

U.S. PATENT DOCUMENTS

| | | | | |
|---|---|---|---|---|
| 5,474,633 | A * | 12/1995 | Myers | B41F 16/00 |
| | | | | 156/583.8 |
| 2008/0196836 | A1 * | 8/2008 | Woods | B30B 15/047 |
| | | | | 156/367 |
| 2008/0217328 | A1 * | 9/2008 | Barnes | A47J 36/027 |
| | | | | 219/725 |
| 2015/0321463 | A1 * | 11/2015 | Robinson | B41F 1/38 |
| | | | | 101/483 |
| 2016/0250816 | A1 * | 9/2016 | Robinson | B30B 1/04 |
| | | | | 100/35 |
| 2018/0036980 | A1 * | 2/2018 | Robinson | B41F 16/0046 |
| 2018/0093439 | A1 | 4/2018 | Anton | |
| 2018/0250928 | A1 * | 9/2018 | Schmidt | B41F 33/16 |
| 2018/0361730 | A1 | 12/2018 | Robinson | |
| 2019/0184667 | A1 * | 6/2019 | Cao | B41F 16/02 |
| 2020/0298548 | A1 * | 9/2020 | Hancock | B32B 37/10 |
| 2020/0324542 | A1 * | 10/2020 | Lin | B30B 15/04 |
| 2021/0299989 | A1 | 9/2021 | Britton | |
| 2022/0040947 | A1 * | 2/2022 | Mombourquette | B30B 1/04 |
| 2023/0051762 | A1 * | 2/2023 | Weibel | D06F 71/08 |
| 2023/0274951 | A1 * | 8/2023 | Noguchi | H01L 24/08 |
| | | | | 438/107 |

FOREIGN PATENT DOCUMENTS

| | | |
|---|---|---|
| CN | 215792485 U | 2/2022 |
| CN | 216659257 U | 6/2022 |
| JP | 03010504 B2 | 2/1991 |
| KR | 100289823 B1 | 5/2001 |
| KR | 100695316 B1 | 3/2007 |
| KR | 101969210 B1 | 4/2019 |

* cited by examiner

HEAT PRESS

CROSS-REFERENCES TO RELATED APPLICATIONS

This U.S. Patent Application is a continuation of, and claims priority under 35 U.S.C. § 120 from U.S. patent application Ser. No. 18/260,202 filed Jun. 30, 2023, which is a U.S. National Phase Application under 35 U.S.C. § 371 of International Application No. PCT/US2022/014117, filed Jan. 27, 2022, which claims priority to and the benefit of U.S. Provisional Patent Application No. 63/142,490 entitled "HEAT PRESS" filed on Jan. 27, 2021, which is incorporated herein by reference.

FIELD

This invention relates to heat presses, and more particularly relates to heat press apparatuses, systems, and methods.

BACKGROUND

While known heat presses, components, apparatuses, systems and methods have proven to be acceptable for various applications, such heat presses, components, apparatuses, systems and methods are nevertheless susceptible to improvements that may enhance their overall performance and cost. Therefore, a need exists to develop improved heat press components, apparatuses, systems and methods that advance the art.

SUMMARY

The subject matter of the present disclosure has been developed in response to the present state of the art, and in particular, in response to the problems and needs in the art that have not yet been fully solved by currently available heat presses. Accordingly, the present disclosure has been developed to provide a heat press that overcomes many or all of the above-discussed shortcomings in the art, in accordance with various embodiments.

Disclosed herein, according to various embodiments, is a heat press. The heat press may include an upper assembly comprising a heat plate, a lower assembly comprising a platen, and a base assembly comprising a hinge mechanism. The upper assembly is pivotably coupled to the lower assembly via the hinge mechanism of the base assembly, according to various embodiments. The heat press may be generally configured to heat and compress, between the heat plate and the platen, a workpiece.

In various embodiments, the heat press is configured to compress, between the heat plate and the platen, a heat-activated design implement against the workpiece to transfer a design of the heat-activated design implement to the workpiece. In various embodiments, the base assembly comprises a drive motor, wherein the drive motor is configured to drive the upper assembly toward the lower assembly to exert a compressive force on the workpiece disposed between the heat plate and the platen. In various embodiments, the heat press further includes a force transducer configured to generate a measured force signal indicative of a magnitude of the compressive force.

In various embodiments, the heat press further includes a controller coupled in control communication with the drive motor and the force transducer, and the controller may be configured to receive the measured force signal from the force transducer and provide closed-loop feedback control to the drive motor, based on the measured force signal, to exert a desired compressive force on the workpiece between the heat plate and the platen. In various embodiments, the desired compressive force is a predetermined and constant force. In various embodiments, the base assembly further comprises a clutch device configured to selectively connect the drive motor in torque transmitting engagement with the hinge mechanism. In various embodiments, the clutch device comprises a spring wrap clutch structure.

In various embodiments, the hinge mechanism comprises a plurality of linkages, that are interconnected at a plurality of rotational axes. In various embodiments, all rotational axes of the hinge mechanism are parallel to a planar surface of the platen. In various embodiments, the plurality of linkages and the plurality of rotational axes are configured to enable and control motion of the upper assembly, relative to the lower assembly, between an open position and a closed position. In various embodiments, in the open position an angle is defined between the heat plate and the platen, wherein the angle is greater than 45 degrees. The angle may be greater than 60 degrees. In the open position a front edge of the upper assembly is rearward of a rear end of the platen of the lower assembly, according to various embodiments.

In various embodiments, the plurality of linkages and the plurality of rotational axes are configured to divide motion of the upper assembly relative to the lower assembly into a rotational motion regime and a translational motion regime. In the translational motion regime, the upper assembly is configured to translate toward the lower assembly, with the heat plate and the platen remaining parallel to each other during translation.

In various embodiments, the plurality of linkages of the hinge mechanism comprises an upper linkage, a lower linkage, and a front linkage. The plurality of rotational axes of the hinge mechanism may include an upper fixed axis, a lower fixed axis, an upper moving axis, and a lower moving axis. In various embodiments, the upper linkage comprises a first end pivotably coupled to a base housing of the base assembly at the upper fixed axis and a second end pivotably coupled to a third end of the front linkage at the upper moving axis. In various embodiments, the front linkage comprises the third end and a fourth end pivotably coupled to a fifth end of the lower linkage at the lower moving axis. In various embodiments, the lower linkage comprises the fifth end and a sixth end pivotably coupled to the base housing of the base assembly at the lower fixed axis.

The front linkage may have an arm section extending from the third end to the upper assembly. The heat press may further include a lift spring coupled to the hinge mechanism, wherein the lift spring is configured to bias the upper assembly toward the open position. In various embodiments, the lower linkage comprises a cantilevered section extending from the sixth end, wherein the cantilevered section is configured to selectively engage a damping device configured to decelerate movement of the upper assembly, being biased by the lift spring, as the upper assembly approaches the open position.

In various embodiments, one linkage of the plurality of linkages of the hinge mechanism comprises a cam surface. In various embodiments, the base assembly further comprises a cam follower linkage comprising a roller configured to engage the cam surface as the upper assembly moves between the open position and the closed position. The lift spring may be a tension spring coupled to the cam follower linkage. Further, the tension spring may be exclusively coupled to the hinge mechanism via the cam follower linkage. In various embodiments, the cam follower linkage is pivotably coupled to the base housing of the base assembly at a rear fixed axis. Further, the cam follower linkage may comprise a seventh end coupled to the lift spring and an eighth end, and the eighth end may comprise the roller.

In various embodiments, the upper assembly of the heat press comprises a fan configured to provide active cooling to the upper assembly. For example, the upper assembly may have a first upper housing and a second upper housing, and an upper chamber may be defined between the first upper housing and the second upper housing, with the fan is disposed in the upper chamber. In various embodiments, an insulation layer is disposed between the fan and the heat plate. The fan may be configured to direct air from the upper chamber into a cooling channel defined between the second upper housing and the insulation layer. The fan may be centrally located relative to a footprint of the heat plate. The cooling channel is configured to direct air from the fan toward a perimeter of the heat plate, according to various embodiments.

In various embodiments, the upper assembly further comprises a skirt circumscribing the perimeter of the heat plate. The skirt may be configured to direct airflow away from the heat plate in a direction perpendicular to an engagement surface of the heat plate. The heat plate may be is coupled to the second upper housing via a plurality of spring-loaded anchors, according to various embodiments. The plurality of spring-loaded anchors may enable angling of the heat plate relative to the second upper housing in response to a shape of a workpiece compressed between the heat plate and the platen. In various embodiments, a rear surface of the heat plate comprises a nest region centrally located relative to a footprint of the heat plate, wherein the second upper housing comprises a hemispherical boss configured to engage the nest region.

In various embodiments, the upper assembly comprises a front edge, two lateral edges, and a rear edge coupled to the hinge mechanism. The front edge, the two lateral edges, and the rear edge may collectively define a perimeter of the upper assembly. The upper assembly may include a handle having a front handle edge that forms a section of, and is shaped to be continuous with, the front edge of the upper assembly. The handle may define a hand clearance opening, wherein the hand clearance opening comprises a pass-through axis that is perpendicular to an engagement surface of the heat plate.

In various embodiments, the handle is coupled to an upper housing of the upper assembly via a connection structure, wherein the connection structure is configured to enable limited movement of the handle relative to the upper housing. In various embodiments, the connection structure comprises a spring mechanism configured to bias the handle to a default position in which exterior surfaces of the handle are continuous with adjacent exterior surfaces of the upper housing. For example, the connection structure may be configured to enable bi-directional movement of the handle relative to the upper housing in response to user-applied force on the handle (e.g., along an axis substantially perpendicular to the heat plate), wherein the spring mechanism is configured to return the handle to the default position in response to removal of the user-applied force. In various embodiments, the connection structure further comprises a handle position sensor configured to detect a position of the handle relative to the upper housing.

Also disclosed herein, according to various embodiments, is a method for a heat press. The heat press may be configured to be coupled in control communication with a controller, the controller comprising a processor and a tangible, non-transitory, computer-readable storage medium, wherein the processor is configured to execute instructions stored on the storage medium to perform various operations of the method. The various operations of the method may include, activating, by the controller, a drive motor, coupled to a hinge mechanism of a base assembly of the heat press, to drive an upper assembly of the heat press toward a lower assembly of the heat press to exert a compressive force on a workpiece disposed between a heat plate of the upper assembly and a platen of the lower assembly.

In various embodiments, the method further includes receiving, by the controller, a measured force signal from a force transducer, wherein the measured force signal is indicative of a magnitude of the compressive force. The method may further include modulating, by the controller, the drive motor based on the measured force signal to exert a desired compressive force on the workpiece. In various embodiments, the desired compressive force is a predetermined and constant force.

The method may further include receiving, by the controller, handle position data from a handle position sensor coupled to a handle of the upper assembly of the heat press. The handle position data may be indicative of a position of the handle relative to an upper housing of the upper assembly. The method may also include determining, by the controller and based on the handle position data, whether a user exerted an activating force or a deactivating force on the handle. In various embodiments, the activating, by the controller, the drive motor is performed in response to determination of the activating force on the handle. In various embodiments, the method further includes receiving, by the controller, upper assembly position data from a hinge position sensor, wherein the upper assembly position data is indicative of a position of the upper assembly relative to the lower assembly. Further, the method may include determining, by the controller and based on the upper assembly position data, whether the upper assembly is within a predetermined threshold proximity to the lower assembly.

In various embodiments, the activating, by the controller, the drive motor is performed in response to determination the upper assembly is within the predetermined threshold proximity to the lower assembly. In various embodiments, the method further includes deactivating, by the controller, the drive motor in response to at least one of a passage of a predetermined amount of time and determination of the deactivating force on the handle. In various embodiments, the deactivating, by the controller, the drive motor comprises actuating, by the controller, a clutch device to decouple the drive motor from torque transmitting engagement with the hinge mechanism. In various embodiments, the activating, by the controller, the drive motor comprises actuating, by the controller, a clutch device to connect the drive motor in torque transmitting engagement with the hinge mechanism. In various embodiments, the method also includes positioning a workpiece on the platen of the lower assembly and/or lowering the upper assembly of the heat press toward the lower assembly, with the upper assembly being pivotably coupled to the lower assembly via a hinge mechanism of a base assembly.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Thus, although the subject matter of the present disclosure is particularly pointed out and distinctly claimed in the concluding portion of the specification, a more complete understanding of the present disclosure may best be obtained by referring to the detailed description and claims when considered in connection with the drawing figures. Understanding that these drawings depict only typical embodiments of the disclosure and are not therefore to be considered to be limiting of its scope, the subject matter of the present application will be described and explained with additional specificity and detail through the use of the accompanying drawings, in which:

DETAILED DESCRIPTION

The detailed description of exemplary embodiments herein refers to the accompanying drawings, which show exemplary embodiments by way of illustration. While these exemplary embodiments are described in sufficient detail to enable those skilled in the art to practice the disclosure, other embodiments may be realized and logical changes and adaptations in design and construction may be made in accordance with this disclosure without departing from the spirit and scope of the disclosure. Thus, the detailed description herein is presented for purposes of illustration only and not of limitation.

Disclosed herein, according to various embodiments, is a heat press and related systems, controls, and methods. The disclosed heat press comprises various structures, components, features, assemblies, systems, and methods that have various benefits and/or that overcome various shortcomings of conventional heat presses. These various structures, components, features, assemblies, systems, and methods, although described herein as pertaining to heat presses, may be utilized and implemented in other machines, industries, applications, etc. That is, the present disclosure is not necessarily limited to heat presses, and thus aspects of the disclosed embodiments may be adapted for performance in a variety of other uses. As such, numerous applications of the present disclosure may be realized.

Some aspects described herein may be directed to a method of utilizing a heat press for the purpose of, for example, heat-activating an adhesive of a heat-activated design implement that may be utilized for crafting a workpiece associated with crafting projects that are easily created and highly customizable before and after printing and/or cutting the heat-activated design implement with, for example processing equipment. In some configurations, the heat press disclosed herein may be configured to generate and apply heat to the heat-activated design implement in the course of heat-activating an adhesive of the heat-activated design implement material. In various embodiments, the heat-activated design implement may comprise inks or materials configured for sublimation transfer to the workpiece.

Figure 1:
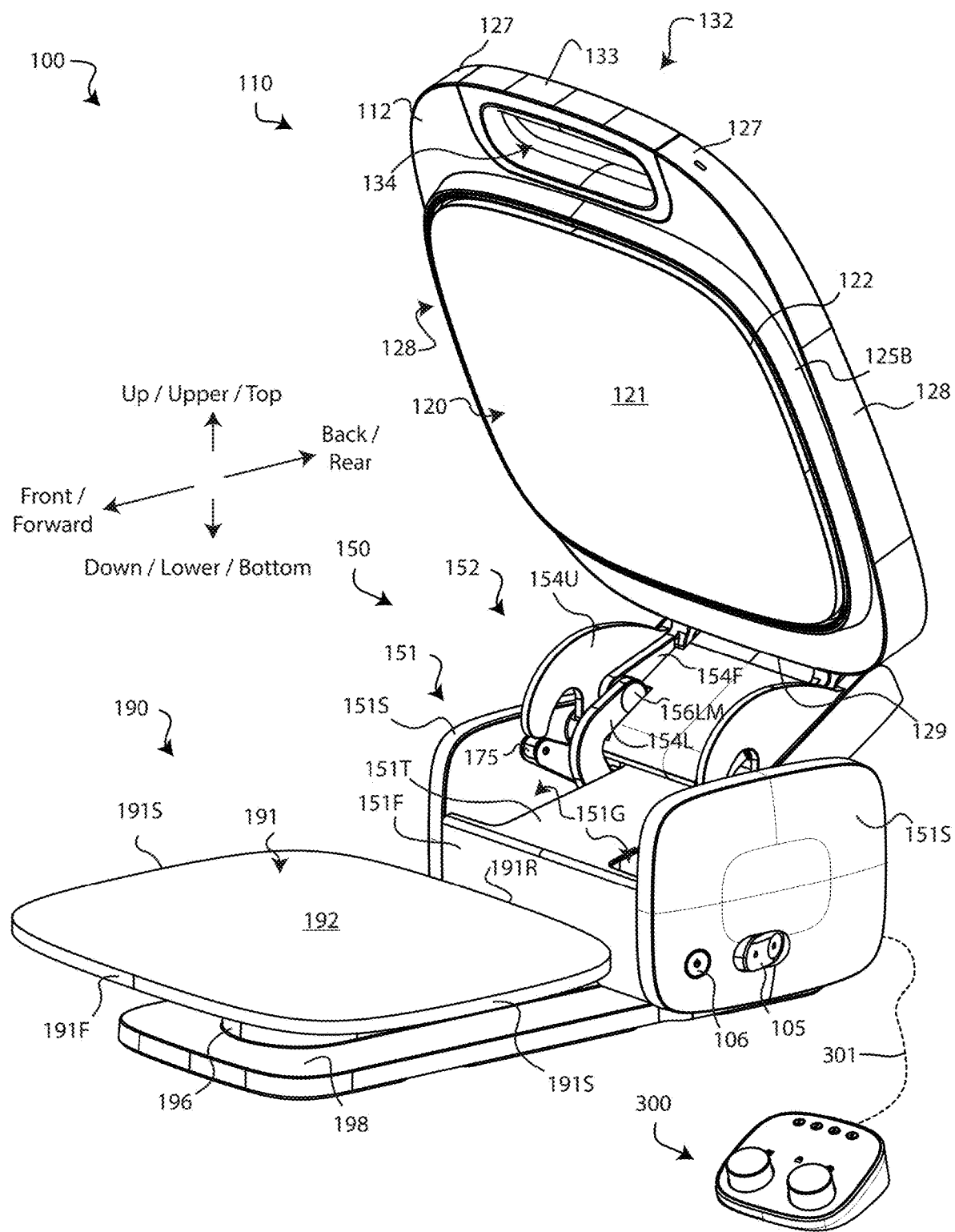
FIG. 1 is a front, right, top perspective view of a heat press, in accordance with various embodiments.
Figure 2:
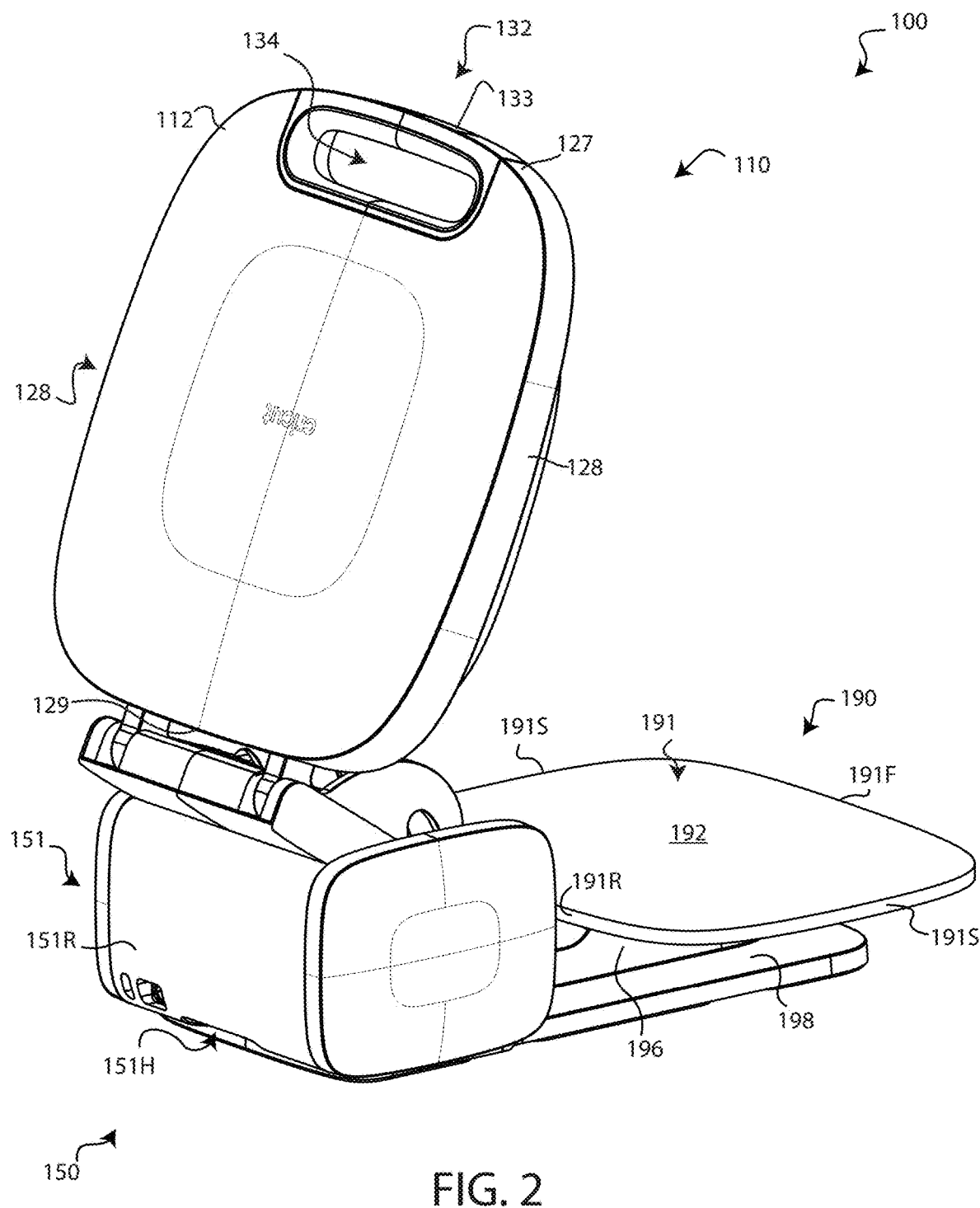
FIG. 2 is a rear, left, top perspective view of a heat press, in accordance with various embodiments.

The disclosed heat press 100, in accordance with various embodiments and with reference to FIGS. 1 and 2, generally includes an upper assembly 110 having a heat plate 120, a lower assembly 190 having a platen 191, and a base assembly 150 comprising a hinge mechanism 152. The upper assembly 110 is pivotably coupled to the lower assembly 190 via the hinge mechanism 152 such that the upper assembly 110 is configured to pivot and move relative to the lower assembly 190, in accordance with various embodiments. As described in greater detail below, the heat press 100 is generally configured to heat and compress, between the heat plate 120 and the platen 191, a workpiece. For example, the heat press 100 may be utilized to compress, between the heat plate 120 and the platen 191, a heat-activated design implement against the workpiece to transfer a design of the heat-activated design implement to the workpiece. The heat may be provided by one or more heat elements (e.g., heating coils) integrated with, disposed within, disposed adjacent to, or otherwise coupled to the material that defines the heat plate.

The heat press 100 and its various assemblies, structures, components, and features, together with the various methods of operation described below, provide various benefits over conventional heat presses. These benefits are described in detail below with reference to the accompanying figures, but a high-level, non-exhaustive summary of the benefits of the heat press 100 is provided immediately below.

The upper assembly 110 of the heat press 100 includes a handle 132 that is integrated and continuous with the overall shape and design of the upper housing 112, according to various embodiments. Further, the upper assembly 110 has an active cooling system to facilitate heat transfer away from the upper assembly 110, thereby enabling the handle 132 to be so integrated, in accordance with various embodiments. Still further, the upper assembly 110 may include a gimbal structure that enables angling of the heat plate 120 relative to the upper housing 112 in order to accommodate different workpieces, in accordance with various embodiments.

Continuing the non-exhaustive summary of the benefits of the heat press 100, the base assembly 150 generally includes a hinge mechanism 152 that includes a plurality of linkages and a plurality of rotational axes, in accordance with various embodiments. The multiple linkages and the multiple rotational axes not only enable the upper assembly 110 to be substantially moved upward and rearward from the lower assembly 190, but also provides for substantially vertical travel of the heat plate 120 over the last portion of the range of motion of the upper assembly 110, according to various embodiments. Said differently, over the last few inches of movement of the upper assembly 110 relative to the lower assembly 190, the heat plate 120 and the platen 191 are configured to remain substantially parallel to each other, thus preventing non-uniform pinching of the rear portion of the workpiece, facilitating accommodation of workpieces of various thickness (without requiring manual adjustments between presses), and enabling a substantially uniform exertion of compressive force on the workpiece, in accordance with various embodiments. That is, the hinge mechanism 152 may be configured to provide a range of motion for the upper assembly 110 that includes a rotational motion regime and a translational motion regime, as described in greater detail below.

Still further, the base assembly 150 may include a drive motor configured to drive the upper assembly 110 toward the lower assembly 190, thus automating and/or motorizing the application of the compressive force, thereby eliminating the need for the user to manually sustain the compressive force during the press, in accordance with various embodiments. For example, the heat press 100 may include a force transducer and thus may be configured to provide closed-loop force feedback to the drive motor in order to achieve and maintain a predetermined, desired compressive force (regardless of thickness of the workpiece), in accordance with various embodiments. Also, the base assembly 150 of the heat press 100 may conceal the wires and other electrical components behind casings and/or within the linkages and axes of the hinge mechanism 152, in accordance with various embodiments. Still further, the base assembly 150 may include a hinge lock configured to reversibly lock the heat press 100 in the closed position (FIG. 3C) for storage and/or transport. Accordingly, the handle 132 on the upper assembly 110, together with a handle 151H formed and defined on a rear side of the base housing 151, may enable convenient and easy lifting and toting of the heat press 100, thus making the heat press 100 portable. Further, the heat press 100 may be wired to be operational with different voltages.

Figure 11:
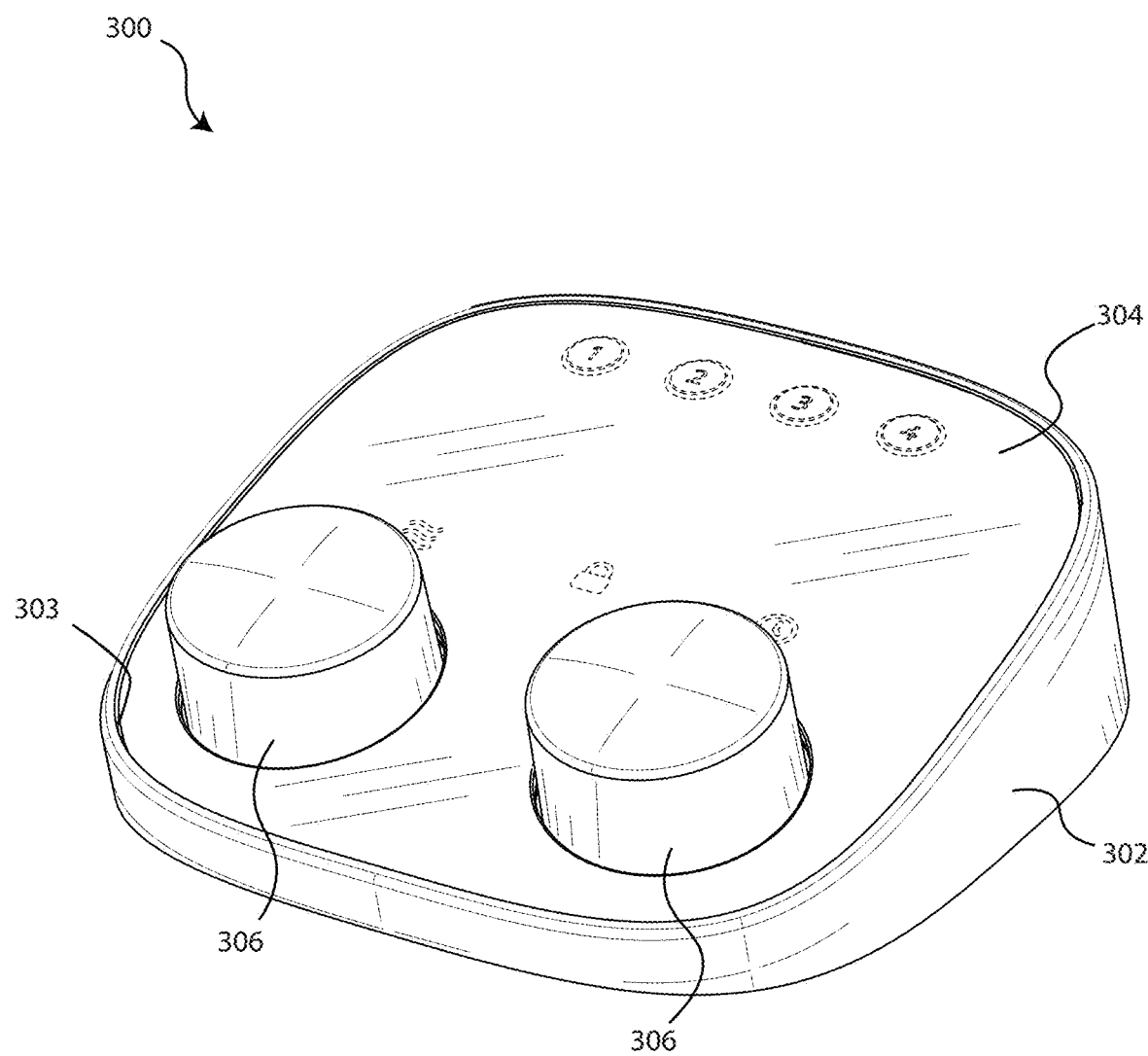
FIG. 11 is a front, right, top perspective view of a controller, in accordance with various embodiments.
Figure 12:
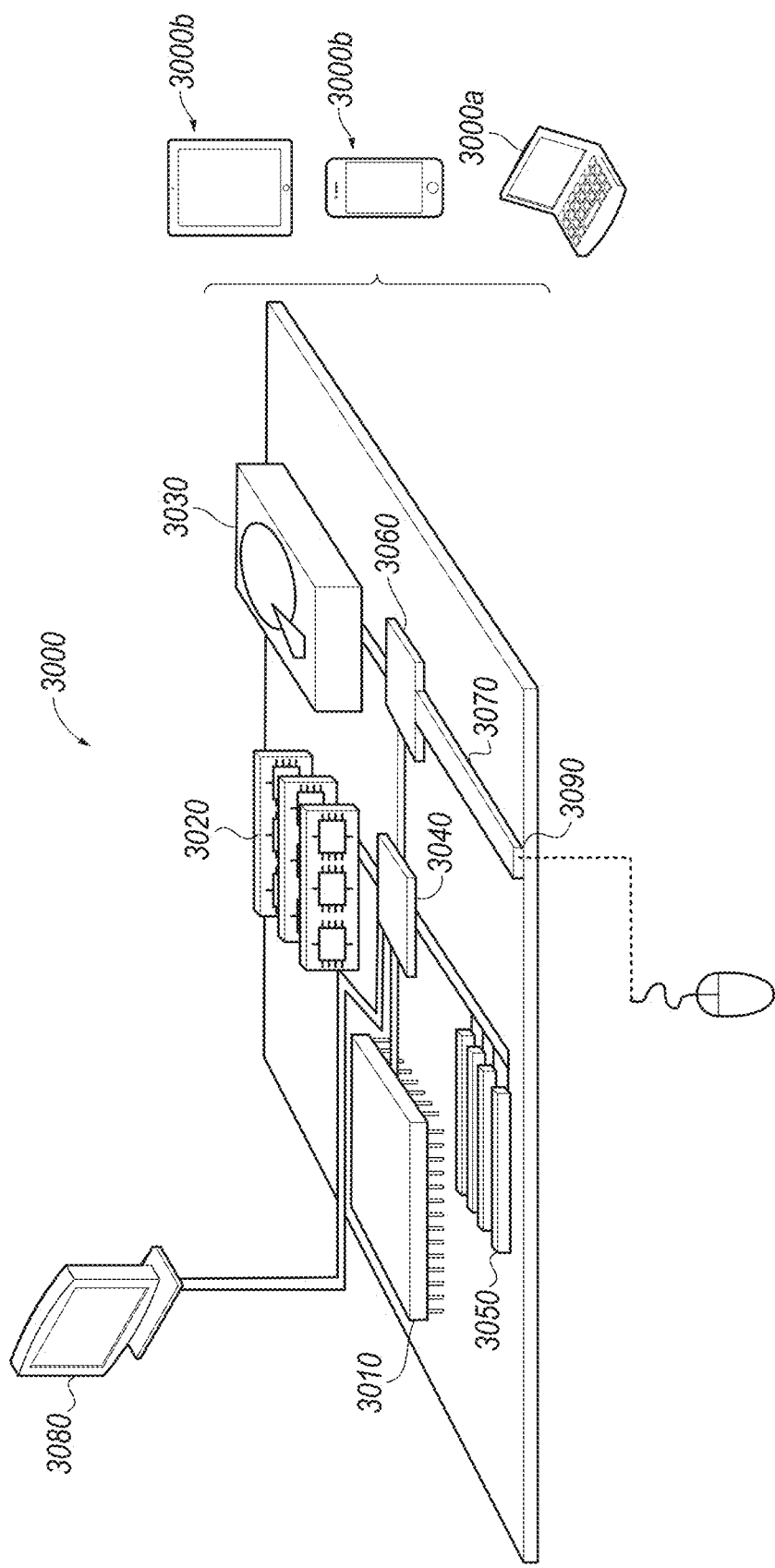
FIG. 12 is schematic view of an example computing device that may be used to implement the systems and methods described herein, in accordance with various embodiments.
Figure 13A:
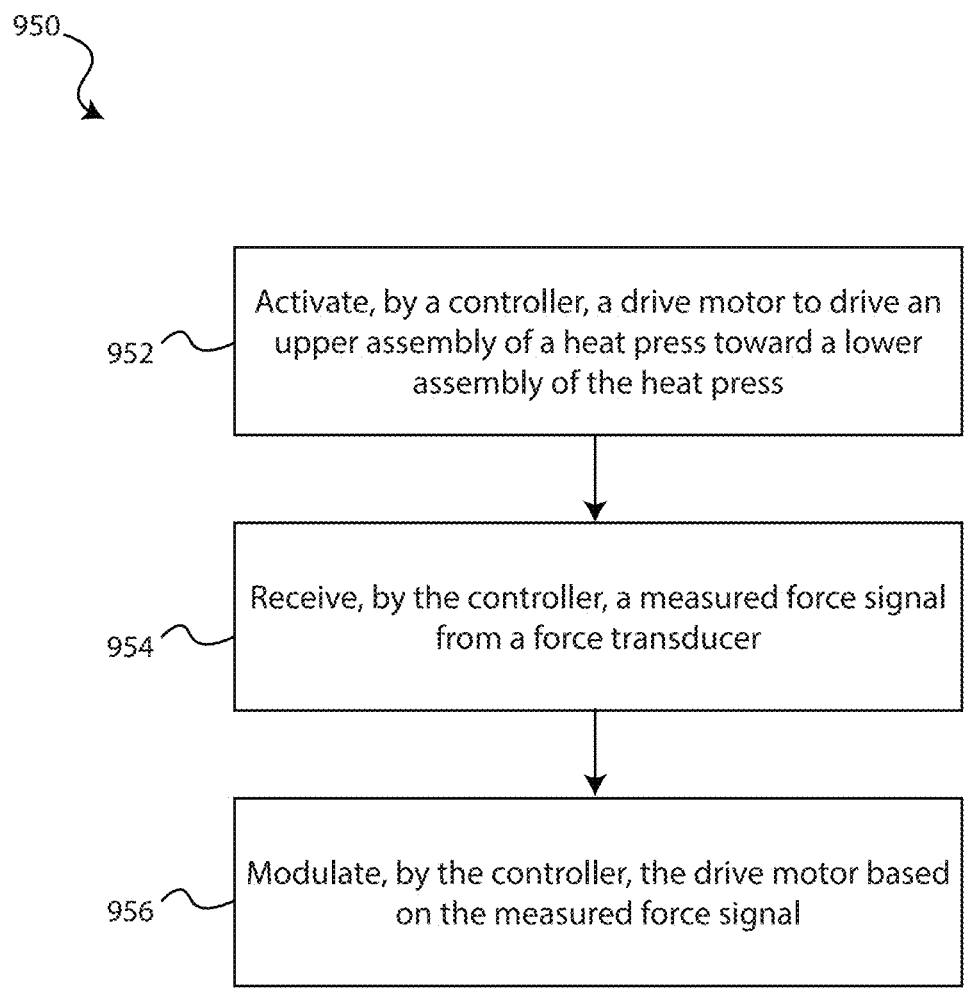
FIGS. 13A and 13B are schematic flow chart diagrams showing methods of controlling and/or using a heat press, in accordance with various embodiments.
Figure 13B:
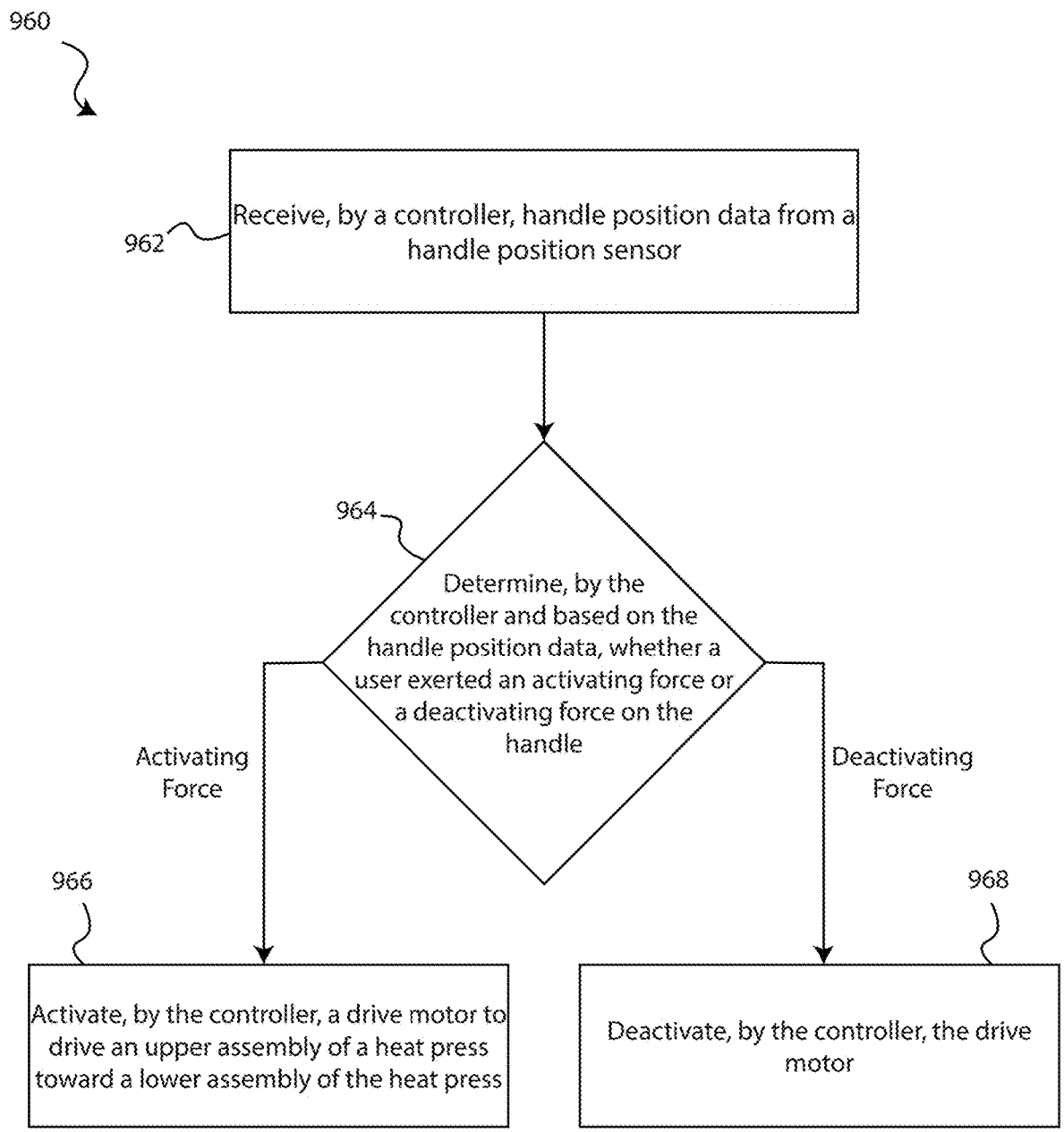

Now to outline the remainder of the present disclosure, the structural details of the heat press 100 are discussed below with reference to FIGS. 1, 2, 3A-3C, 4A-4E, 5, 6A-6D, 7, 8, 9, and 10. FIGS. 11 and 12 discuss controllers and/or control systems for operating the heat press 100. and FIGS. 13A and 13B are schematic flow chart diagrams providing a non-exhaustive depiction of exemplary methods for using and/or operating the heat press 100, in accordance with various embodiments.

Figure 3A:
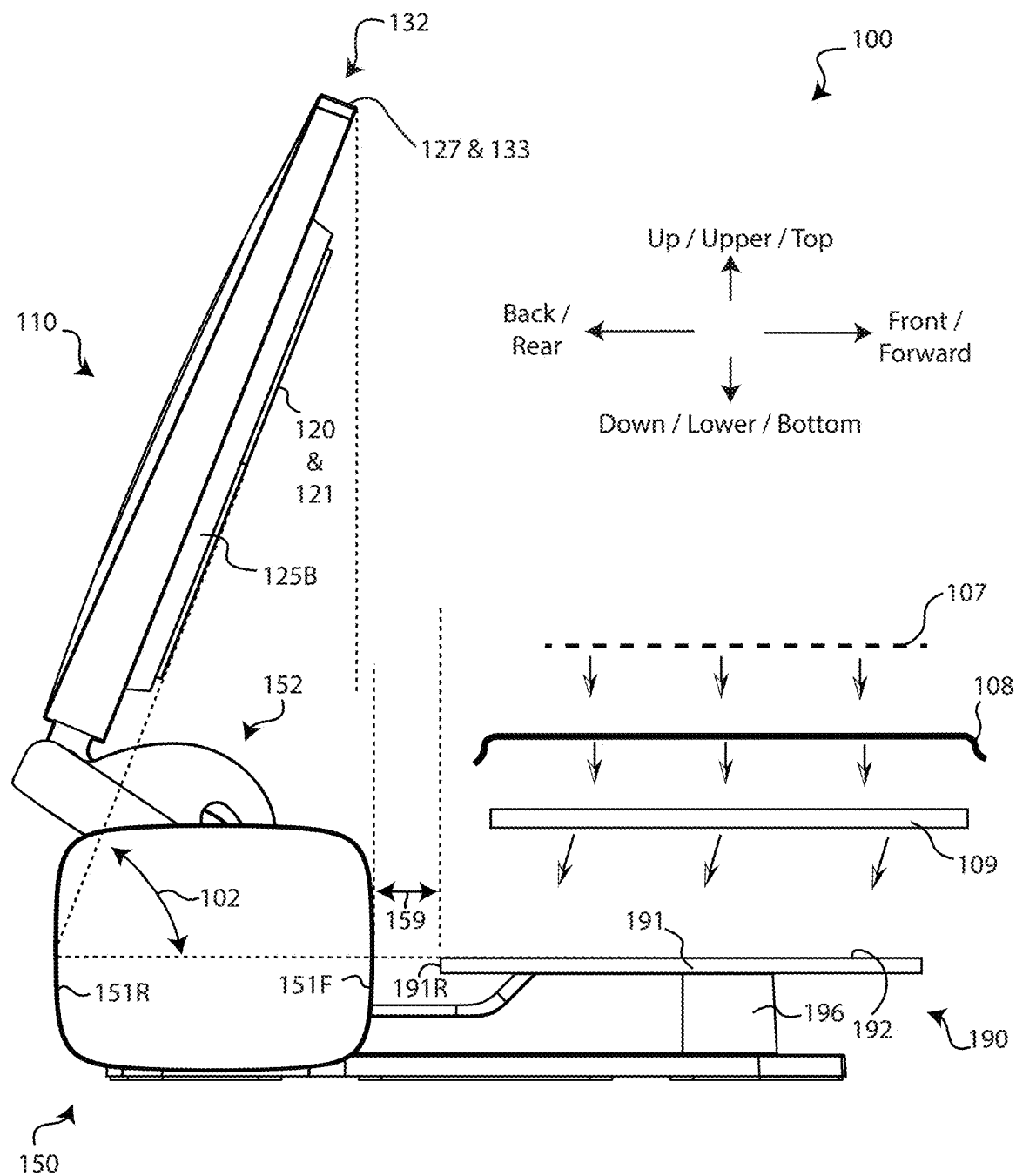
FIG. 3A is a left side view of a heat press having an upper assembly in an open position, in accordance with various embodiments.

In various embodiments, and with continued reference to FIGS. 1 and 2, the upper assembly 110 includes a handle 132 that is integrated and substantially continuous with the upper housing 112. Said differently, the upper housing 112 may be generally shaped to have a front edge 127, opposing side edges 128, and a rear edge 129 opposite the front edge 127. As used herein, the terms "front" and "rear," as well as the terms "upper" and "lower," as well as corresponding synonyms, are generally used to describe the relative position and/or orientation of various components. The directional arrows provided in FIGS. 1 and 3A show these positional terms and are all based on a standard use-case in which a user interacts with the heat press 100 from the front of the heat press 100.

The handle 132 may define a hand clearance opening 134. The hand clearance opening 134 of the handle 132 may have a center pass-through axis that extends substantially perpendicular to an engagement surface 121 of the heat plate 120. In various embodiments, the handle does not have a pass-through aperture, but may instead have a recess, cavity, flange, knob, or other feature that can be grasped by a user. The handle 132, although having a seam or a break between the remainder of the upper housing 112 (to facilitate small movement of the handle 132 relative to the upper housing 112, as described below with reference to FIG. 8), has a front handle edge 133 that forms a section of the front edge 127 of the upper housing 112, thus having a continuous design/shape. The top and bottom surfaces of the handle 132 are also similarly continuous with the adjacent top and bottom sections of the upper housing 112, thereby further providing the appearance that the handle is a continuous structure with the upper housing 112. Further details pertaining to the structure and features of the upper assembly 110 are provided below with reference to FIGS. 7, 8, 9, and 10.

The base assembly 150 of the heat press 100, which generally interconnects the upper assembly 110 to the lower assembly 190, also provides the hinge mechanism 152 for enabling the movement of the upper assembly 110 relative to the lower assembly 190. The base assembly 150 may include a base housing 151 that comprises various sections or various casings. For example, the base housing 151 may include a forward casing 151F, side casings 151S, a rear casing 151R, and a top casing 151T. In various embodiments, the base housing 151 generally covers and hides the wires and other components of the base assembly 150. In various embodiments, one or more gaps 151G may be defined between the top casing 151T and the side casings 151S to receive opposing pairs of linkages of the hinge mechanism 152 as the heat press 100 transitions from the open position (see, e.g., FIGS. 1, 2, 3A, 4E) to the closed position (FIGS. 3C and 4A).

In various embodiments, the hinge mechanism 152 includes a plurality of linkages 154 and a plurality of rotational axes 156 that are configured to enable and control motion of the upper assembly 110 relative to the lower assembly 190 between the open and closed positions. The plurality of linkages 154 and the plurality of axes 156 are described in greater detail below with reference to FIGS.

4A-4E, but the plurality of linkages 154 are generally interconnected to each other and to the base housing 151 at the plurality of axes 156, thereby enabling rotation of the various linkages relative to each other. In various embodiments, all the rotational axes 156 of the hinge mechanism 152 are parallel to each other and are parallel to a planar top surface 192 of the platen 191 of the lower assembly 190.

In various embodiments, the hinge mechanism 152 is configured to bias the heat press 100 toward the open position. Additional details pertaining to this concept are included below, but the heat press 100 may be generally configured to fail open and may thus be predisposed to occupy the open configuration. Accordingly, the heat press 100 may include a hinge lock button 105. The hinge lock button 105 may be coupled to a hinge lock pin 104 (FIG. 4A) configured to lock the hinge mechanism 152 in the closed position when the heat press 100 is not in use, thus enabling compact storage and transport of the heat press 100. Said differently, the hinge lock pin 104 counteracts the structure of the hinge mechanism 152 that biases the upper assembly to the open position. In various embodiments, the heat press 100 may include various other user interface buttons and/or switches, such as a power (e.g., an "on/off") button 106. Further, the heat press 100 may include various power input connections and/or data/controller connection interfaces (e.g., on a rear casing 151R of the base housing 151).

In various embodiments, the lower assembly 190 includes the platen 191 supported by a narrow neck portion 196 and a foundation portion 198. Said differently, the platen 191 may be coupled to the neck portion 196, and the neck portion 196 may be coupled to foundation portion 198 that is configured to engage a table or ground surface for supporting the heat press 100. The platen 191 may be wider than the foundation portion 198, and the foundation portion 198 may be wider than the neck portion 196. Accordingly, there may be substantial free space around the platen 191 to enable the user to manipulate and otherwise position workpieces onto the platen 191 (described in greater detail below with reference to FIGS. 3A-3C).

In various embodiments, a heat press system may include the heat press 100 and a standalone controller 300 configured to control operation of the heat press 100. The connection 301 between the controller 300 and the heat press 100 be wired or wireless. As described in greater detail below with reference to FIGS. 11 and 12, the controller 300 may generally include one or more processors and a storage medium having instructions stored thereon. The one or more processors may be configured to implement various logical operations in response to execution of instructions, for example, instructions stored or loaded on the tangible, non-transitory, computer-readable medium configured to communicate with the controller. The system program instructions may include instructions that, in response to execution by a processor, cause the controller to control operation of the heat press 100. In various embodiments, the controller 300 be configured to connect to a computer or other cloud based device to receive updated control software and/or firmware to upload to the heat press 100 for control of the heat plate electronic components (e.g., heat plate, motors, sensors, etc.). Instead of and/or in addition to the controller 300, the one or more processors and the storage medium may be integrated into the heat press 100 itself (e.g., electronic circuits, etc.), and/or other devices may be coupled in wired or wireless control communication with the heat press 100, such as one or more servers, a laptop, a personal computer, a smartphone, etc. Accordingly, the functionality and various method steps for using the heat press 100 may be described as the controller 300 implementing various operations, however the actual receiving, determining, processing, and other functionality may be performed by various electronic components, as described below in greater detail.

The appearance of the heat press 100, according to various embodiments, is specifically designed and themed to have different aesthetic sections. For example, the external surfaces of the upper assembly 110 and the base assembly 150 (with the exception of the metallic heat plate 120) may generally be formed of a plastic material to provide a refined, consumer device-type aesthetic, with the lower assembly 190 having an exposed metallic plate forming the platen 191, thus having an almost industrial aesthetic. These two "sections" of the heat press 100 may be purposefully colored and textured in a contrasting manner to impart a novel design aesthetic to the heat press 100.

Figure 3B:
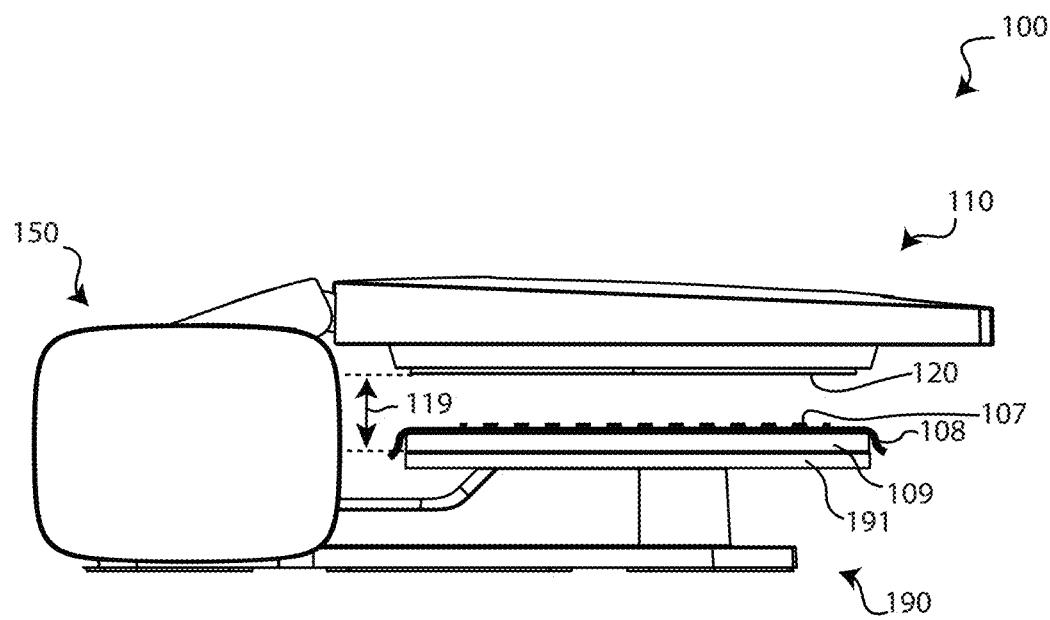
FIG. 3B is a left side view of the heat press of FIG. 3A after the upper assembly has been rotated from the open position, through a rotational motion regime, to the depicted intermediate position, in accordance with various embodiments.
Figure 3C:
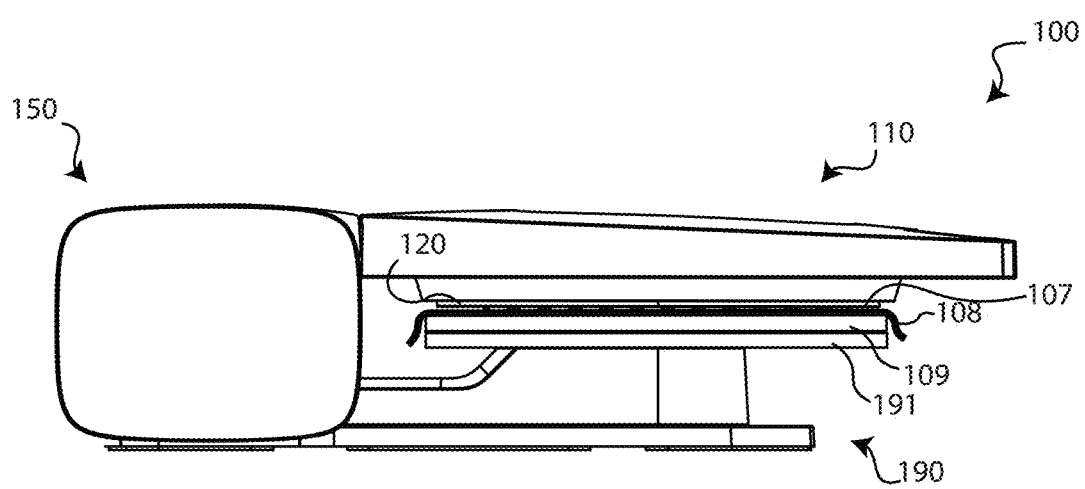
FIG. 3C is a left side view of the heat press of FIG. 3B after the upper assembly has been rotated from the intermediate position, through a translational motion regime, to the depicted closed position, in accordance with various embodiments.
Figure 4A:
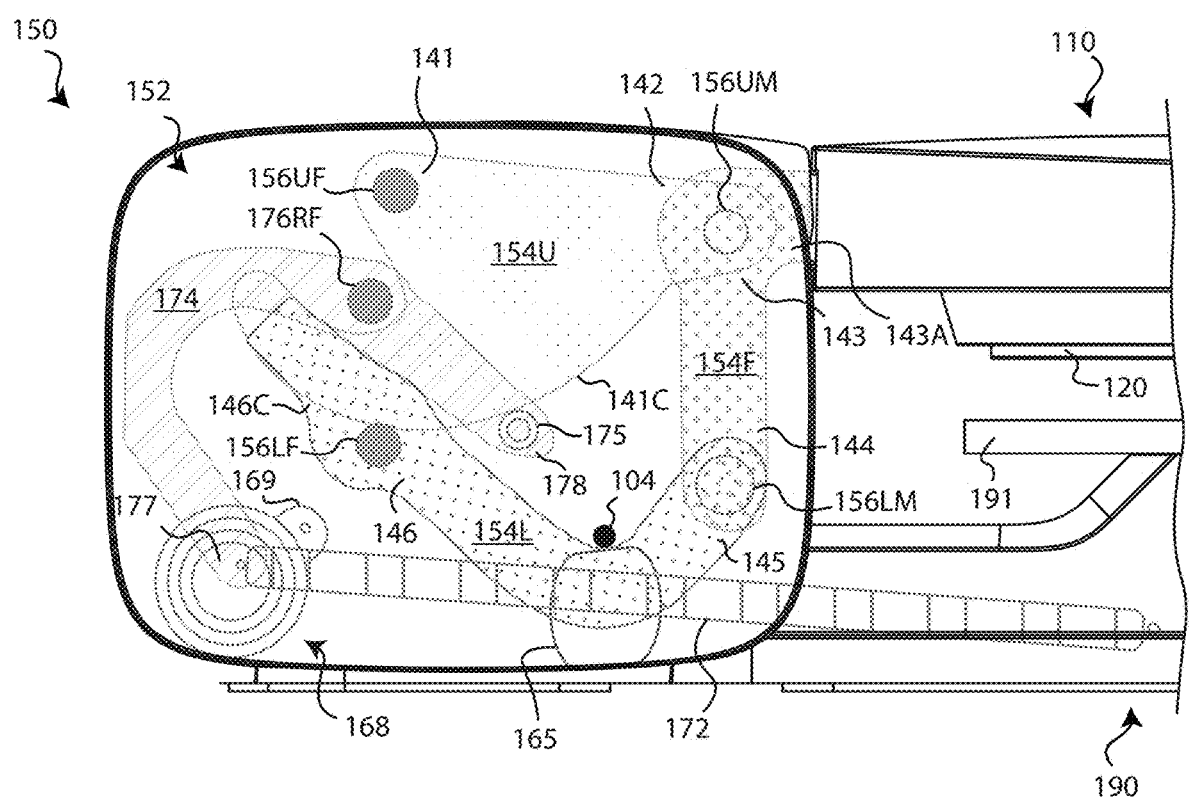
FIGS. 4A, 4B, 4C, 4D, and 4E are left side schematic views of a hinge mechanism of a base assembly of a heat press transitioning from a closed position (FIG. 4A) to an open position (FIG. 4E)
Figure 4B:
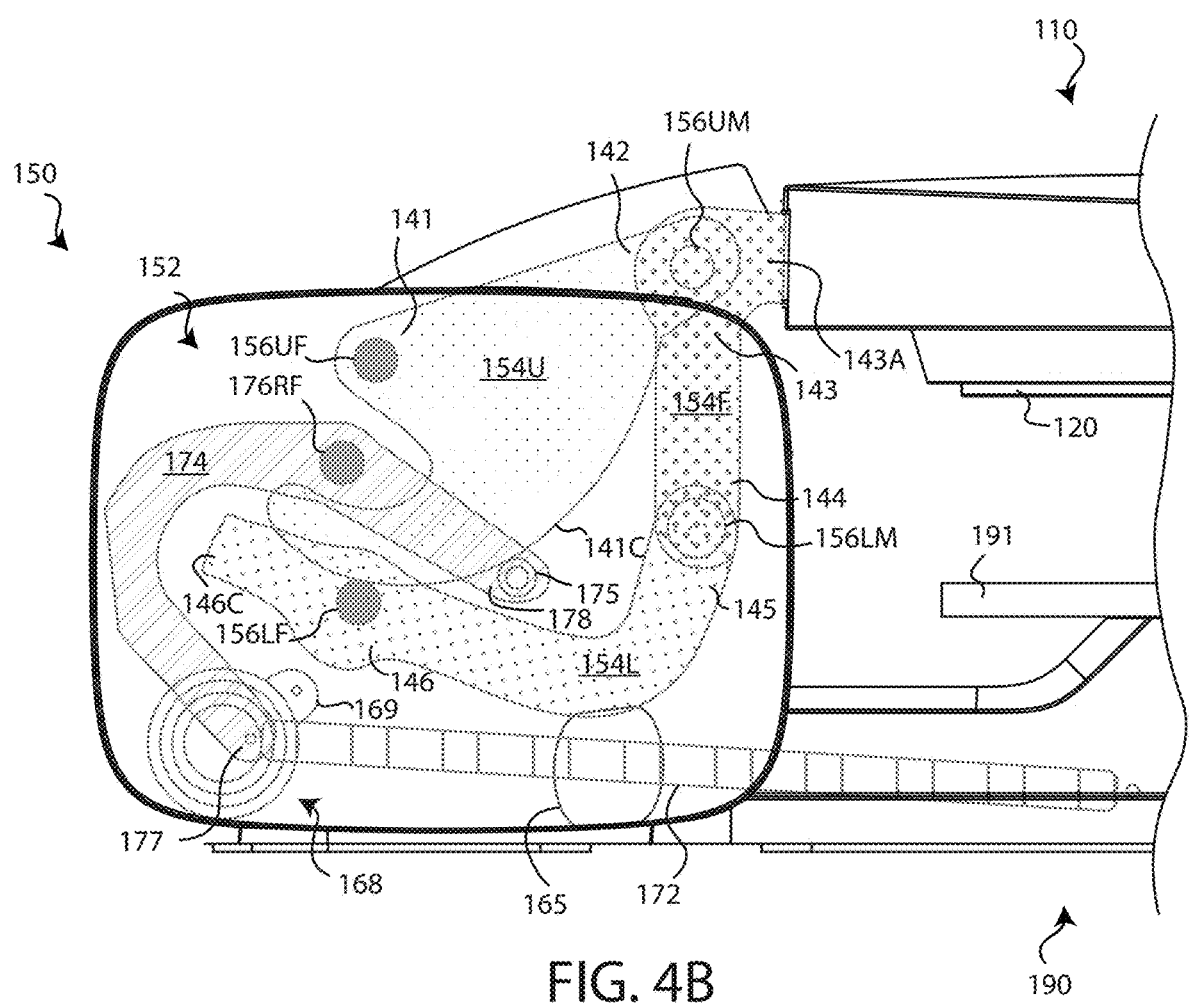
Figure 4C:
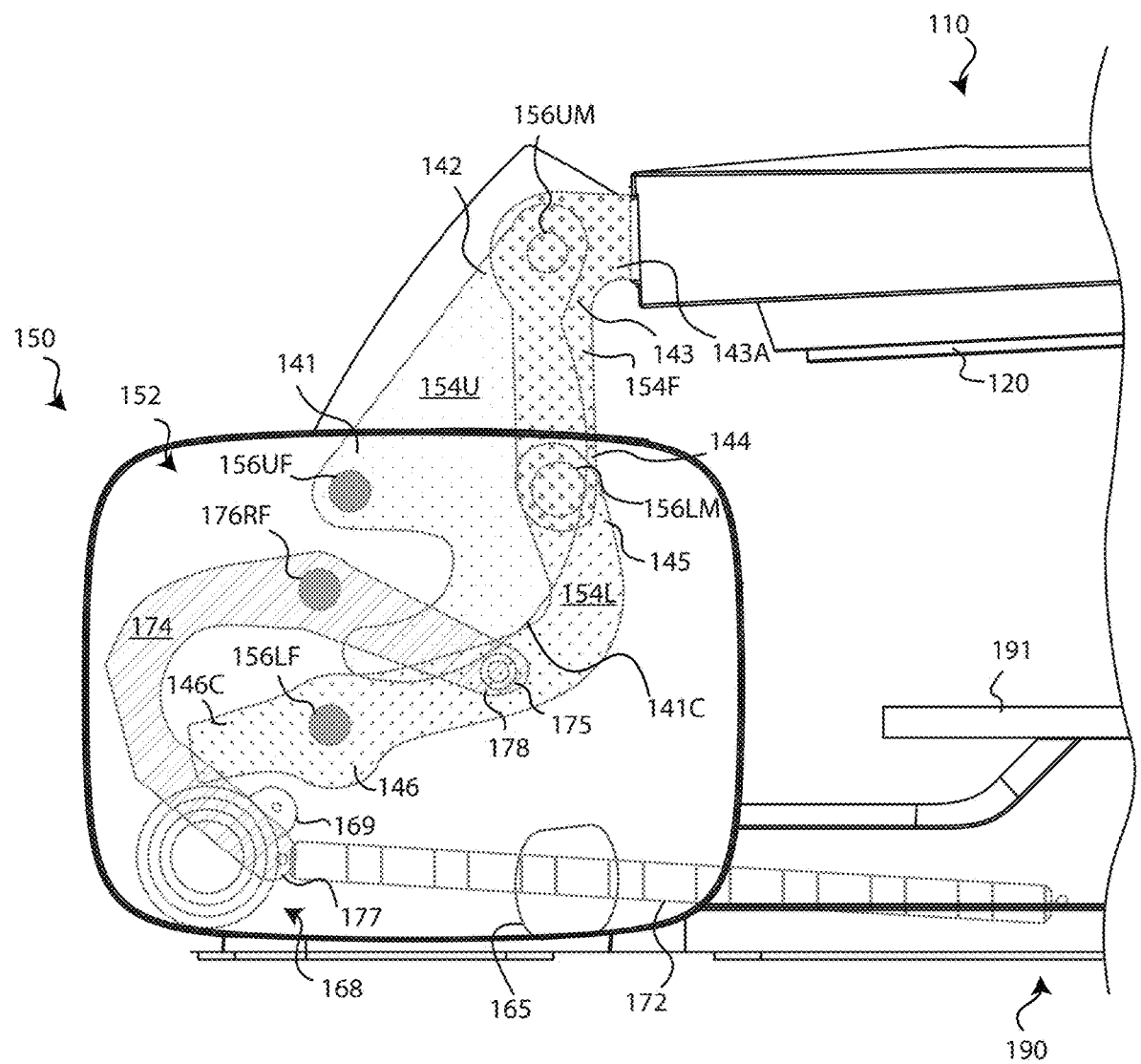

In various embodiments, and with reference to FIGS. 3A, 3B, and 3C, the heat press 100 is shown in an open position, an intermediate position, and a closed position, respectively. In the open position (i.e., fully opened), the hinge mechanism 152 may be configured to provide an opening angle 102, as defined between a planar engagement surface 121 of the heat plate 120 and a planar surface 192 of the platen 191, that is greater than 45 degrees, according to various embodiments. In various embodiments, the opening angle 102 is greater than 60 degrees. In various embodiments, the opening angle is 62 degrees. In various embodiments, in the open position a plane of the planar engagement surface 121 of the heat plate 120 intersects a plane of the planar surface 192 of the platen at a rear edge of the base assembly 150 (i.e., at the rear casing 151R of the base housing 151).

The upper assembly 110 of the heat press 100 may be configured, via the hinge mechanism 152, to move upward and rearward away from the platen as the heat press 100 transitions to the open position. That is, the motion of the upper assembly 110 may be constrained such that side edges of the heat plate 120 remain generally aligned with side edges 191S of the platen 191 (i.e., the heat plate 120 is not configured to move laterally side to side, but instead is limited to vertical translation and/or pivoting motion about axes that are parallel to the planar surface 192 of the platen 191.

In various embodiments, the hinge mechanism 152 is configured to position the upper assembly 110, in the open position, sufficiently rearward of the platen 191 that a front edge of the upper assembly 110 (i.e., the front edge 127 of the upper housing 112 and/or the front handle edge 133 of the handle 132) is rearward of a rear edge 191R of the platen 191 of the lower assembly 190 (see FIG. 3A). In various embodiments, the hinge mechanism 152 is configured to position the upper assembly 110, in the open position, sufficiently rearward such that the front edge of the upper assembly 110 (i.e., the front edge 127 of the upper housing 112 and/or the front handle edge 133 of the handle 132) is rearward of a front edge of the base assembly 150 (i.e., the forward casing 151F). In various embodiments, the extent of rearward motion of the upper assembly 110 enabled by the hinge mechanism 152 of the base assembly 150 provides plenty of space for users to position and configure a workpiece 108 on the platen 191 in preparation for a heat press operation.

Further, regarding ease of use and working space for the user, a gap 159 may be defined between the front edge of the base assembly 150 (i.e., the forward casing 151F) and the rear edge 191R of the platen such that excess workpiece material may be tucked in the gap 159. Further, as described above, the overhang of the rear edge 191R of the platen 191 relative to the neck portion 196 of the lower assembly 190 provides additional space for excess material to occupy during a heat press operation.

In various embodiments, and with reference to FIGS. 3A-3C, a heat press system may include a heat press pad 109 configured to rest upon the platen 191 to support a workpiece 108 thereon. In various embodiments, a heat-activated design implement may be positioned adjacent to the workpiece 108 (e.g., on top of the workpiece 108). In various embodiments, a heat press system may include multiple heat press pads 109 to enable a user to perform a press using one of the heat press pads 109 while the user prepares another heat press pad 109 with another workpiece 108 (and optionally another heat-activated design implement 107). In various embodiments, the heat press 100 may be utilized and operated without a heat press pad.

In various embodiments, the hinge mechanism 152 of the base assembly 150 is configured to provide two different types of motion across the entire range of motion between the open position and the closed position. Said differently, the hinge mechanism 152, specifically the plurality of linkages 154 and the plurality of rotational axes 156 (e.g., as described in greater detail below with reference to FIGS. 4A-4E), may be configured to "divide" the motion of the upper assembly 110 relative to the lower assembly 190 into a rotational motion regime and a translational motion regime. In the rotational motion regime, the predominant type of motion is rotational, as such the angle of the planar engagement surface 121 of the heat plate 120 of the upper assembly 110, relative to the lower assembly 190, continuously changes as the upper assembly moves toward or away from the open position. To be clear, in the rotational motion regime there may be some level of translating motion as the plurality of linkages rotate relative to each other, but the predominant motion-type is rotational/pivoting movement of the upper assembly 110. This rotational motion regime is depicted, according to various embodiments, as the transition between the open position in FIG. 3A and the intermediate position in FIG. 3B (also shown as the respective transitions between FIGS. 4B, 4C, 4D, and 4E).

In the translational motion regime, the predominant type of motion is translational, as such the angle of the planar engagement surface 121 of the heat plate 120 of the upper assembly 110, relative to the lower assembly 190, remains substantially constant as the upper assembly 110 moves toward or away from the lower assembly. Said differently, in the translational regime the heat plate 120 is substantially parallel to the platen 191 as the upper assembly 110 moves toward or away from the open position (e.g., in a substantially vertical direction). This translational motion regime is depicted, according to various embodiments, as the transition between the intermediate position in FIG. 3B and the closed position in FIG. 3C (also shown as the transitions between FIGS. 4A and 4B). In the translational motion regime, the heat plate 120 is configured to descend towards or ascend away from the workpiece 108 disposed on the platen 191 in a substantially vertical and parallel manner, thus inhibiting pinching, rolling, scrunching, or other forms of non-uniform compression on the workpiece.

In various embodiments, the intermediate position shown in FIG. 3B, which represents the transition between the rotational motion regime and the translational motion regime, is configured with the heat plate 120 spaced a vertical distance 119 away from the platen. This vertical distance 119 (also referred to herein as a parallel motion gap) is between about 1 inch and about 3 inches, according to various embodiments. In various other embodiments, the vertical distance 119 is about 2 inches. In various embodiments, this vertical distance 119 is roughly equal to the gap 159 defined between the front edge of the base assembly 150 (i.e., the forward casing 151F) and the rear edge 191R of the platen 191. In various embodiments, this vertical distance 119 is about 1⁄4 to about 1⁄10 the width of the heat plate 120, as measured laterally from side to side of the heat plate 120. Depending on the thickness of the workpiece, the intermediate position of FIGS. 3B and 4B may, practically, be functionally the same as the closed position, as the workpiece may occupy the entire vertical distance 119, and thus the heat press may be functionally "closed." Accordingly, the vertical distance 119 parameter may define the maximum thickness of workpieces that are recommended to be processed using the heat press 100.

Turning to FIGS. 4A, 4B, 4C, 4D, and 4E, the hinge mechanism 152 of the base assembly 150 may include a plurality of linkages 154 interconnected variously with each other at a plurality of rotational axes 156. The plurality of linkages 154 may include, for example, two or more linkages. In various embodiments, the plurality of linkages 154 includes three linkages, with the base housing 151 functioning as a fourth linkage (i.e., connecting two fixed axes). For example, the plurality of linkages 154 may include an upper linkage 154U, a lower linkage 154L, and a front linkage 154F and the plurality of rotational axes 156 may include an upper fixed axis 156UF, a lower fixed axis 156LF, an upper moving axis 156UM, and a lower moving axis 156LM. To help with tracking the various linkages and axes throughout the views shown in FIGS. 4A-4E, the fixed rotational axes (i.e., the axes that remain fixed relative to the base assembly 150 and thus do NOT move) are shown as filled-in shafts while the moving rotational axes are shown as open shafts. As used in this context, the term axis/axes is used interchangeably with the term shaft/shafts. That is, regardless of whether the reference line is directed toward a shaft for supporting rotation or the rotational axis of the shaft itself, the concept of the axes being the locations at which the linkages are interconnected with each other to achieve motion of the upper assembly 110 holds.

The linkages and axes shown in FIGS. 4A-4E are shown in a schematic-like view and are shown as transparent to see the relative movement of the linkages and axes. As seen in some of the other figures, such as the perspective views in FIGS. 1 and 5, the linkages 154 and axes 156 are offset from each other (i.e., into and out of the page) and thus do not occupy the same plane. However, in order to clearly show relative motion of the linkages and axes, the linkages and axes are shown as transparent in FIGS. 4A-4E. Further, various linkages are actually pairs of opposing linkages disposed on opposite lateral sides of the hinge mechanism. Also, various other structural details, surfaces, casings, fasteners, etc. are purposefully not shown in FIGS. 4A-4E to avoid obscuring the linkages and axes.

In various embodiments, the upper linkage 154U comprises a first end 141 pivotably coupled to the base housing 151 of the base assembly 150 at the upper fixed axis 156UF and a second end 142 pivotably coupled to a third end 143 of the front linkage 154F at the upper moving axis 156UM. In various embodiments, the front linkage 154F comprises the third end 143 and a fourth end 144 pivotably coupled to a fifth end 145 of the lower linkage 154L at the lower moving axis 156LM. In various embodiments, the lower linkage 154L comprises the fifth end 145 and a sixth end 146 pivotably coupled to the base housing 151 of the base assembly 150 at the lower fixed axis 156LF.

In various embodiments, the lower linkage 154L has an "L" shape, with the concave apex of the "L" shape facing upward in the closed position and rearward in the open position. The lower linkage 154L may be configured to experience about 90 degrees of rotation between the closed position and the open position. The upper linkage 154U may experience greater than 90 degrees of rotation between the closed position and the open position and may experience more rotation than the lower linkage 154L. The front linkage 154F may experience less than 90 degrees of rotation between the closed position and the open position, and thus may experience less rotation than either the upper linkage 154U or the lower linkage 154L. However, the front linkage 154F, being the linkage that extends between the two moving rotational axes, experiences translational movement, as it transitions from being substantially within the footprint of the base housing 151 when viewed from the side (as shown in FIGS. 4A-4E) in the closed position to be substantially entirely without the footprint of the base housing 151 when viewed from the side (as shown in FIGS. 4A-4E), according to various embodiments. In various embodiments, the front linkage 154F comprises an arm section 143A extending from the third end 143 to the upper assembly 110. Said differently, the upper assembly 110 may be attached to the hinge mechanism via the arm section 143A of the front linkage 154F. In various embodiments, the entire upper assembly may be configured to gimbal relative to the hinge mechanism 152 in order to accommodate different workpieces. For example, the entire upper assembly may be pivotably and/or hingedly coupled to the hinge mechanism.

In various embodiments, as mentioned above, the hinge mechanism 152 is biased toward the open position. Accordingly, the heat press 100 may include a mechanism configured to bias the upper assembly 110 toward the open position. In various embodiments, the biasing mechanism is one or more lift springs 172 (e.g., tension/extension springs) coupled to the hinge mechanism 152. For example, the lift spring 172 may have an end that is directly coupled to one of the plurality of linkages 154, with an opposing end directly coupled to an anchoring point (e.g., an anchor of the base assembly 150 or the lower assembly 190). In various embodiments, multiple lift springs may be utilized to provide sufficient tension to lift the upper assembly. In various embodiments, the multiple lift springs may be connected to the hinge mechanism 152 at different locations, or may be respectively anchored to different locations on the base assembly 150 or the lower assembly 190. In alternative embodiments, the biasing mechanism of the heat press 100 may be a traction gas spring or one or more torsion springs. For example, one or more of the rotational axes may be configured with a torsional spring to bias the linkages coupled to thereto toward the open position.

In order to facilitate smooth motion of the hinge mechanism 152, the base assembly 150 of the heat press 100 may include a cam structure. That is, the cam structure stabilizes the motion of hinge mechanism 152, for example during manual lowering of the upper assembly, thereby inhibiting "catches" in the hinging motion and/or limiting variations in the force required to manually moving the upper assembly 110 relative to the lower assembly 190. In various embodiments, one of the linkages of the plurality of linkages 154 functions as a cam and thus has a cam surface, and the base assembly 150 may further include a cam follower linkage 174 having a roller 175 configured to engage the cam surface during motion of the upper assembly 110 between the open position and the closed position. In various embodiments, the lift spring 172 may be coupled to the cam follower linkage 174. For example, the cam follower linkage may have a seventh end 177 coupled to the lift spring 172 and an eighth end 178 comprising the roller 175. The cam follower linkage 174 may be coupled to the base housing 151 at a rear fixed axis 176RF.

In various embodiments, the upper linkage 154U functions as the cam and thus comprises cam surface 141C. Accordingly, the eighth end 178 of the cam follower linkage 174 having the roller 175 may be configured to engage the cam surface 141C of the upper linkage 154U. In such a configuration, the tension force of the lift spring 172 exerts a forward force on the seventh end 177 of the cam follower linkage 174, which biases the cam follower linkage 174 to pivot about the rear fixed axis 176RF and thereby drive the eighth end 178 of the cam follower linkage 174 upward and/or rearward, which in turn biases the entire hinge mechanism 152 (i.e., all of the linkages 154 and the rotational axes 156) to move and/or rotate toward the open position, according to various embodiments. As shown in FIGS. 4A-4E, the roller 175 at the eighth end 178 of the cam follower linkage 174 remains engaged against the cam surface 141C of the upper linkage 154U throughout the entire motion of the upper assembly 110 between the open position and the closed position. Accordingly, in various embodiments, the hinge mechanism 152, including the plurality of linkages 154 and rotational axes 156, is not directly coupled to the lift spring 172, but instead the lift spring 172 is coupled to the hinge mechanism 152 via the cam follower linkage 174.

In various embodiments, the cam follower linkage 174 has a "U" shape. The shapes of the various linkages 154, 174 may be selected to avoid collisions between linkages and/or shafts/axes 156 as the hinge mechanism motions between the open and closed positions. For example, the upper linkage 154U may have a wave-like shape, with the cam surface 141C comprising the convex surface of the wave-like shape. The concave surface of the wave-like shape may be recessed sufficiently to accommodate the rear fixed axis 176RF of the cam follower linkage 174. In various embodiments, the rear fixed axis 176RF is disposed vertically between the upper fixed axis 156UF and the lower fixed axis 156LF. In various embodiments, the upper fixed axis 156UF is forward of the rear fixed axis 176RF of the cam follower linkage 174.

Various axes of the plurality of axes may be shafts that extend across the base assembly 150 to interconnect the opposing pairs of linkages, while various other axes do not extend across the base assembly 150, but instead are merely comprises of local joints on opposing sides of the base assembly 150. For example, the upper fixed axis 156UF, the lower fixed axis 156LF, and the upper moving axis 156UM may be a shaft that extends across the base assembly 150, while the lower moving axis 156LM may comprise two joints on opposing sides of the base assembly 150, without an intervening shaft structure interconnecting them.

In various embodiments, and with continued reference to FIGS. 4A-4E, the heat press 100 further includes a hinge lock pin 104. The hinge lock pin 104 may be coupled to the hinge lock button 105 and may be configured to selectively engage one or more of the linkages to prevent rotation of the one or more linkages, thereby locking the heat press 100 in a desired orientation/position. For example, the hinge lock button 105 may be configured to be depressible in response to the heat press 100 being in the closed position. That is, in the closed position, the hinge lock pin 104 may be able to be inserted into, for example, an elbow of the lower linkage 154L to prevent movement/rotation of the lower linkage, and thereby locking the hinge mechanism 152. As mentioned above, locking the hinge mechanism 152 in such a manner may facilitate handling, carrying, and/or storage of the heat press 100, as the user may grasp handle 132 and/or handle 151H to transport the heat press in the collapsed configuration of the closed position.

In various embodiments, the base assembly 150 also comprises a damping device 168. The damping device 168 may be configured to decelerate the spring-biased movement of the upper assembly 110 as it approaches the open position. Said differently, the biasing of the heat press 100 toward the open position may, without the damping device 168, be susceptible to recoil and tipping as the upper assembly 110 jarringly and suddenly arrives at the open position. In various embodiments, the damping device 168 comprises a viscous damper, such as a rotary-type viscous damper. The viscous damper may comprise multiple disks that have a viscous fluid interposed between them that resists movement of the disks relative to each other. Accordingly, the damping device 168 may include a flange 169 that is configured to engage one or more linkages of the hinge mechanism 152 to damp (e.g., slow, decelerate) the motion of the linkages as the upper assembly 110 approaches the open position. For example, the lower linkage 154L may have a cantilevered section 146C extending from the sixth end 146, with the cantilevered section 146C being configured to selectively engage the flange 169 of the damping device 168 to decelerate movement of the upper assembly (which is biased by the lift spring 172) as the upper assembly 110 approaches the open position.

Figure 4D:
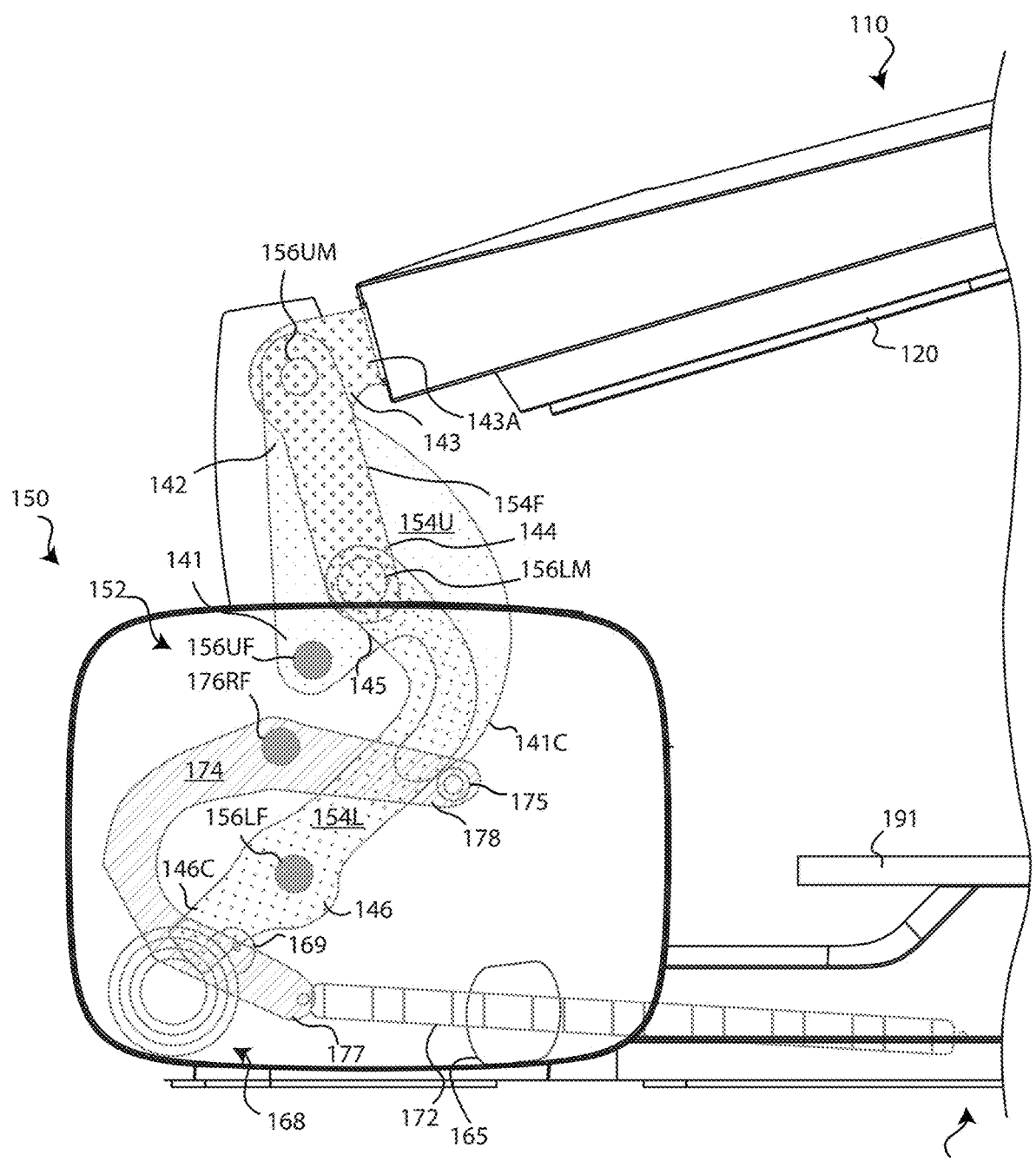
Figure 4E:
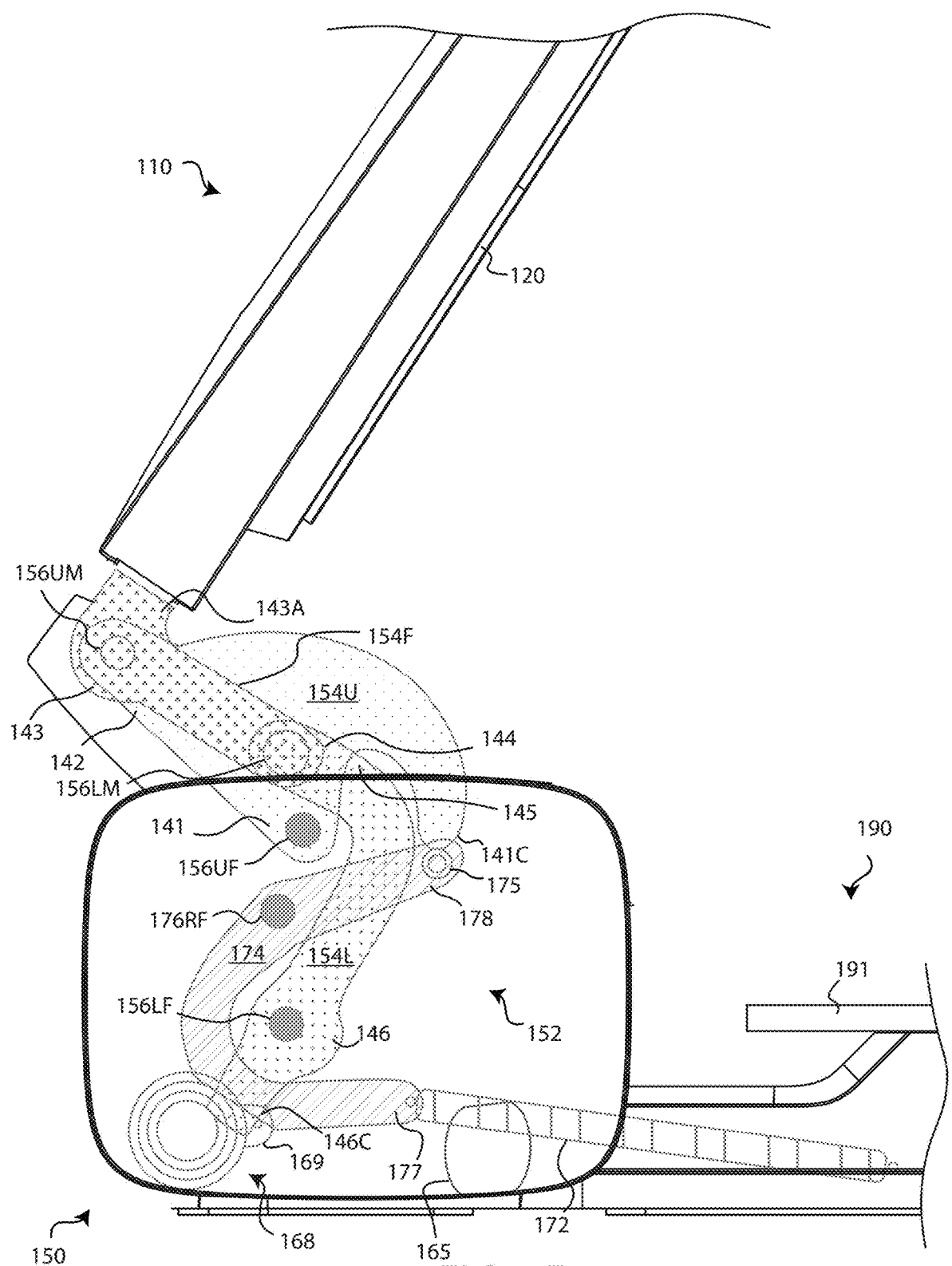

The damping device 168 (e.g., the viscous damper) may have a one-way clutch, thus preventing the damping device from impeding reverse movement of the cantilevered section 146C (i.e., the damping device 168 does not impede the linkages as the upper assembly 110 moves toward the closed position), in accordance with various embodiments. The damping device 168 may be configured to only damp the final degrees of travel (e.g., the final 20-45 degrees of travel) as the upper assembly 110 approaches the open position. For example, the damping device 168 may be configured to only damp movement of the linkages after the upper assembly 110 has moved a certain distance away from the lower assembly. FIG. 4D shows an example of the cantilevered section 146C initializing contact with the flange 169 of the damping device, and FIG. 4E shows the cantilevered section 146C causing rotation of the flange 169 as the flange 169 correspondingly slows the rotation of the lower linkage 154L. The damping device may take other forms. For example, the damping device may be a spring device or may have other configurations to slow rotation of the hinge mechanism 152. As mentioned above, in various embodiments a traction gas spring may be utilized as the biasing mechanism, and the traction gas spring may be self-damping, and may thus not need a separate damping device.

With continued reference to FIGS. 4A-4E, the heat press 100 may also include a position sensor 165 configured to detect a position of the hinge mechanism 152 and/or the upper assembly 110. For example, the position sensor 165 may be disposed within the base assembly 150 and may be configured to detect the presence (i.e., position) of one or more of the linkages 154. The position sensor 165 may be configured to detect position data from the position sensor 165 indicative of the position of the upper assembly 110 relative to the lower assembly 190. The position data may be utilized by the controller 300 or other processor to control operation of the heat press 100, as described in greater detail below with reference to FIGS. 13A and 13B. For example, the position sensor 165 may be configured to determine when the lower linkage 154L is positioned in the sensor's field of view (see, e.g., FIGS. 4A and 4B) and to also report when the lower linkage 154L is positioned outside of the sensor's field of view (see, e.g., FIGS. 4C, 4D, and 4E).

Figure 5:
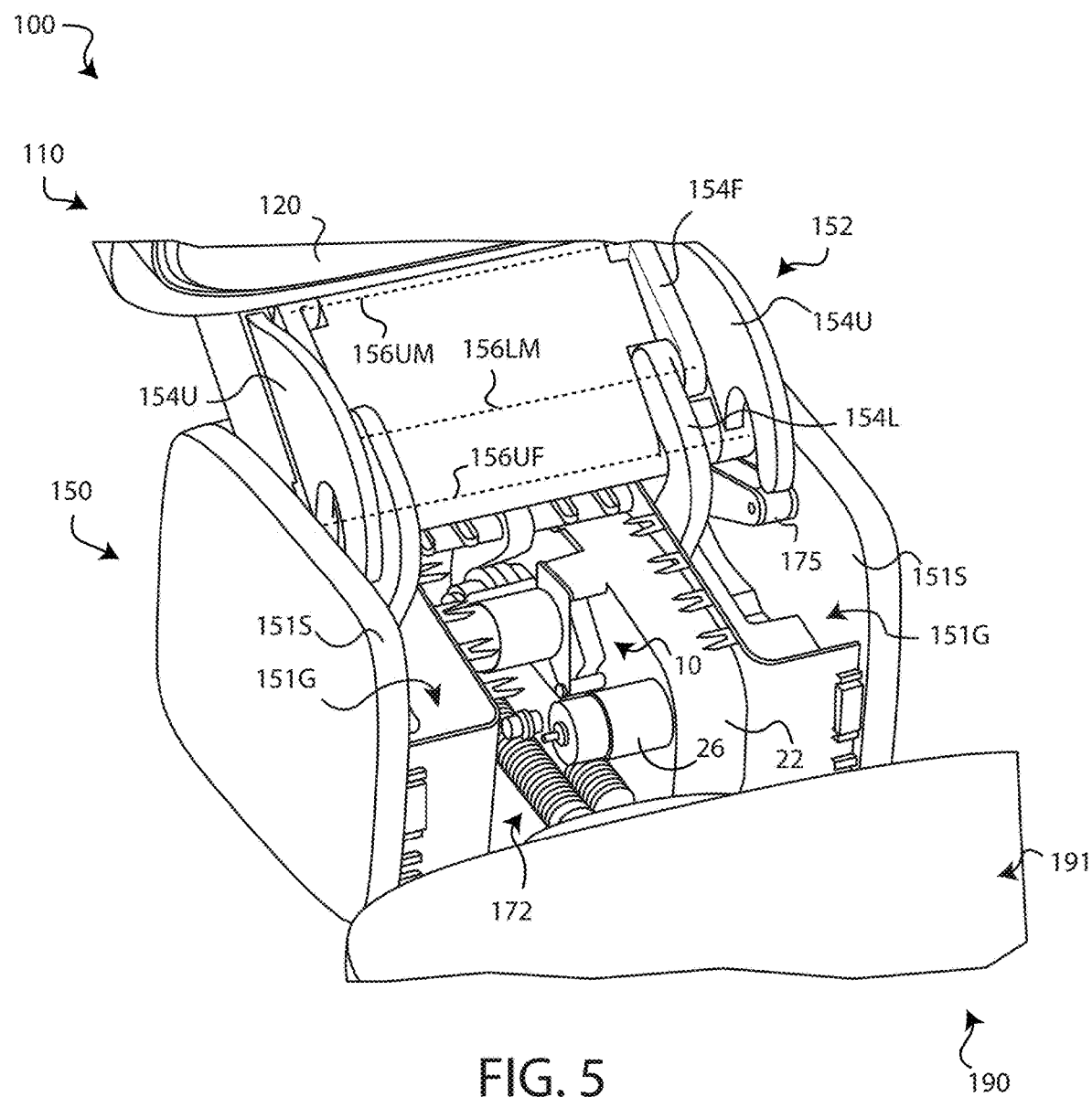
FIG. 5 is a front, left, top perspective partial view of the heat press of FIG. 1, but with various casings of a base assembly removed to show a drive motor and clutch assembly housed within the base assembly, in accordance with various embodiments.

FIG. 5 shows a perspective view of the base assembly 150, with various casing sections removed to show the underlying components. Said differently, FIG. 5 shows the base assembly 150 with top casing 151T and forward casing 151F removed, revealing the lift spring 172, a clutch assembly 10, a drive motor 26, and a gear box 22, according to various embodiments. The clutch assembly 10, the drive motor 26, and the gear box 22 are described in greater detail below with reference to FIGS. 6A-6D. Also shown in FIG. 5 are the gaps 151G for accommodating the opposing pairs of linkages of the hinge mechanism 152 when the upper assembly is rotated to the closed position.

In various aspects of the present disclosure, and with reference to FIGS. 6A-6D, a novel spring wrap assembly includes an active engagement mechanism to decrease the time it takes for the spring wrap to engage a hub and couple an input shaft or gear with an output shaft. In various aspects of the present disclosure, the quick engagement of a novel spring wrap clutch to engage two hubs or shafts makes the spring wrap clutch assembly advantageous for low-speed applications. Further, the present disclosure provides a quick release of the spring wrap clutch for automatic and rapid disengagement of an input shaft or gear from an output shaft. In various embodiments, the clutch assembly disclosed herein may be generally configured to tighten a wrap spring by a means other than a drive motor. For example, as described below, a clutch motor or other similar configuration may be utilized to actively wrap/tighten the clutch spring to operably couple the drive motor in torque transmitting communication with the hinge mechanism 152.

Traditional spring wrap clutches are used in high rotational speed applications, where the lag time between the winding of the spring wrap clutch and its engagement with the input and/or output shaft is negligible, based on the high rotational speed of the input shaft, which is inversely proportional to the time (or "lag time") it takes for the clutch to couple the shafts together. In other words, in systems where the input shaft is rotating at high speeds, once the spring wrap clutch is activated, the input shaft or hub winds the spring against the output shaft at the same high speed of the input shaft. Thus, even though it may take 10 or 20-degrees of rotation, for example, to fully wind the spring tightly against both shafts for sufficient friction to couple the shafts together, the 10 or 20-degrees of lag time taken to tighten the spring may only be a few milliseconds. In most applications, this lag time is negligible and typically not noticeable. However, the lag time associated with traditional spring wrap clutches can be a problem in systems with lower input rotational speeds. The slower the speeds, the greater the spring wrap lag time, and the less negligible or more noticeable the lag becomes. Accordingly, there are several issues related to the use of spring wrap clutches of the prior art in slow rotational systems.

Embodiments of spring wrap clutch assemblies, systems, and apparatus of the present disclosure overcome the challenges of spring wrap clutches discussed above, especially as applied to low-speed rotational systems. As noted above, spring wrap clutches described herein reduce or eliminate any lag time associated with the engagement thereof, which is especially advantageous in slow rotational systems, where typical lag times are amplified. In addition, the spring wrap clutch assemblies disclosed herein can be disengaged quickly and consistently, again reducing disengagement lag times and inconsistencies found in the prior art.

Figure 6A:
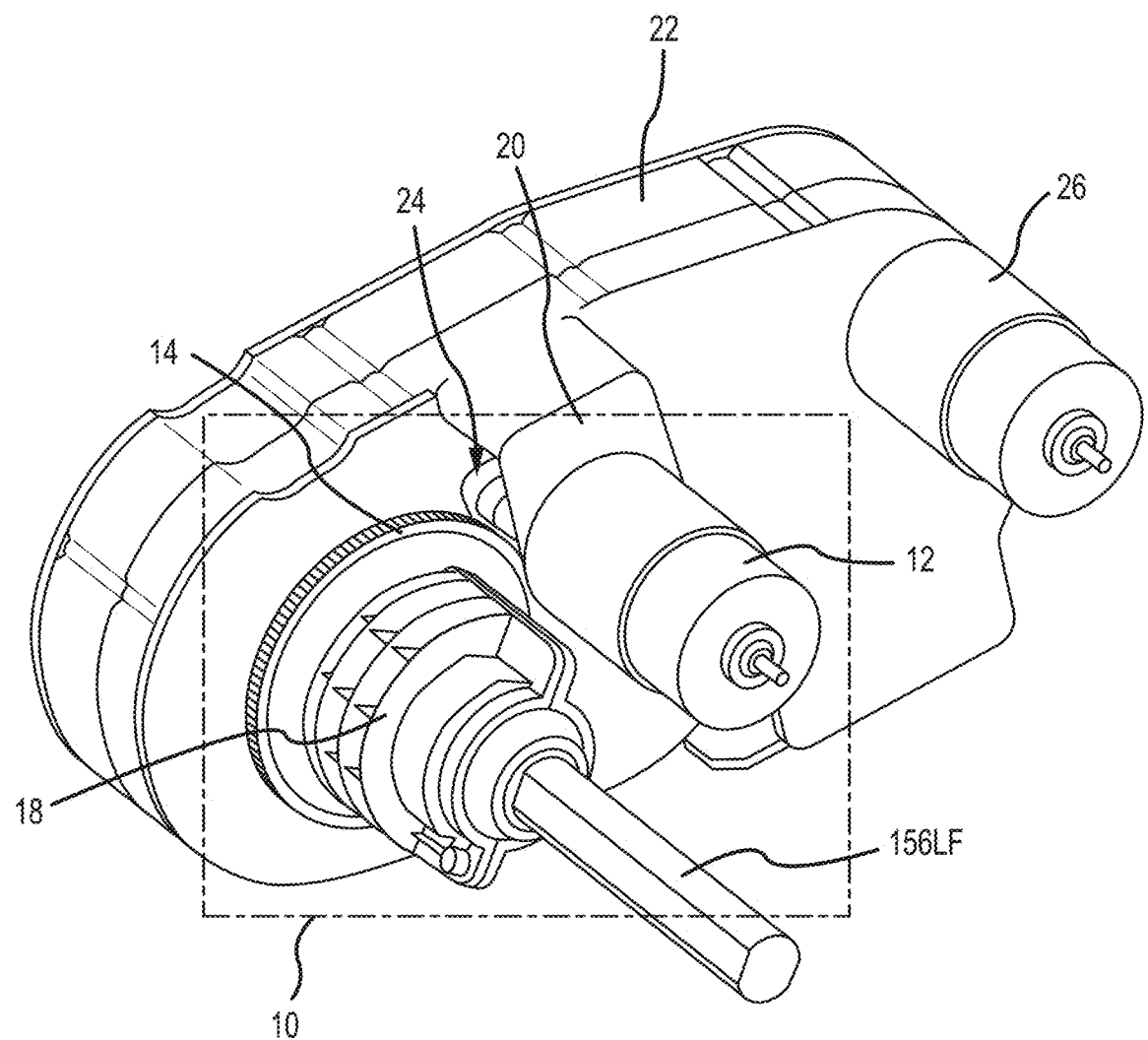
FIGS. 6A, 6B, 6C, and 6D are views of a clutch assembly, drive motor, and a gearbox, in accordance with various embodiments.

In various embodiments, and with reference to FIGS. 6A-6D, a spring wrap clutch assembly 10 is provided, which includes a clutch motor 12, a clutch output gear 14, an output shaft (e.g., lower fixed axis 156LF), and a girdle 18 that surrounds portions of an input gear and hub, an output hub, and a spring, all of which are illustrated in subsequent figures. FIG. 6A also illustrates a motor mount 20 to which clutch motor 12 is fixed, the motor mount 20 being fixed to the gear box 22.

Behind motor mount 20 is disposed a planetary arm assembly 24 that includes one or more gears, which may be selectively actuated by clutch motor 12. The gears of planetary arm assembly 24 will be described in more detail below. Referring further to the embodiment shown in FIG. 6A1, a drive motor 26 is fixed to gear box 22 and selectively actuates one or more gears within gear box 22. In general, the gears and configurations thereof within gear box 22 may vary in one or more other embodiments but may be designed to provide appropriate gear ratios and power outputs necessary for a given application. In this way, drive motor 26 rotationally drives an input gear and hub (not visible in FIG. 6A) located at least partially within girdle 18.

Figure 6B:
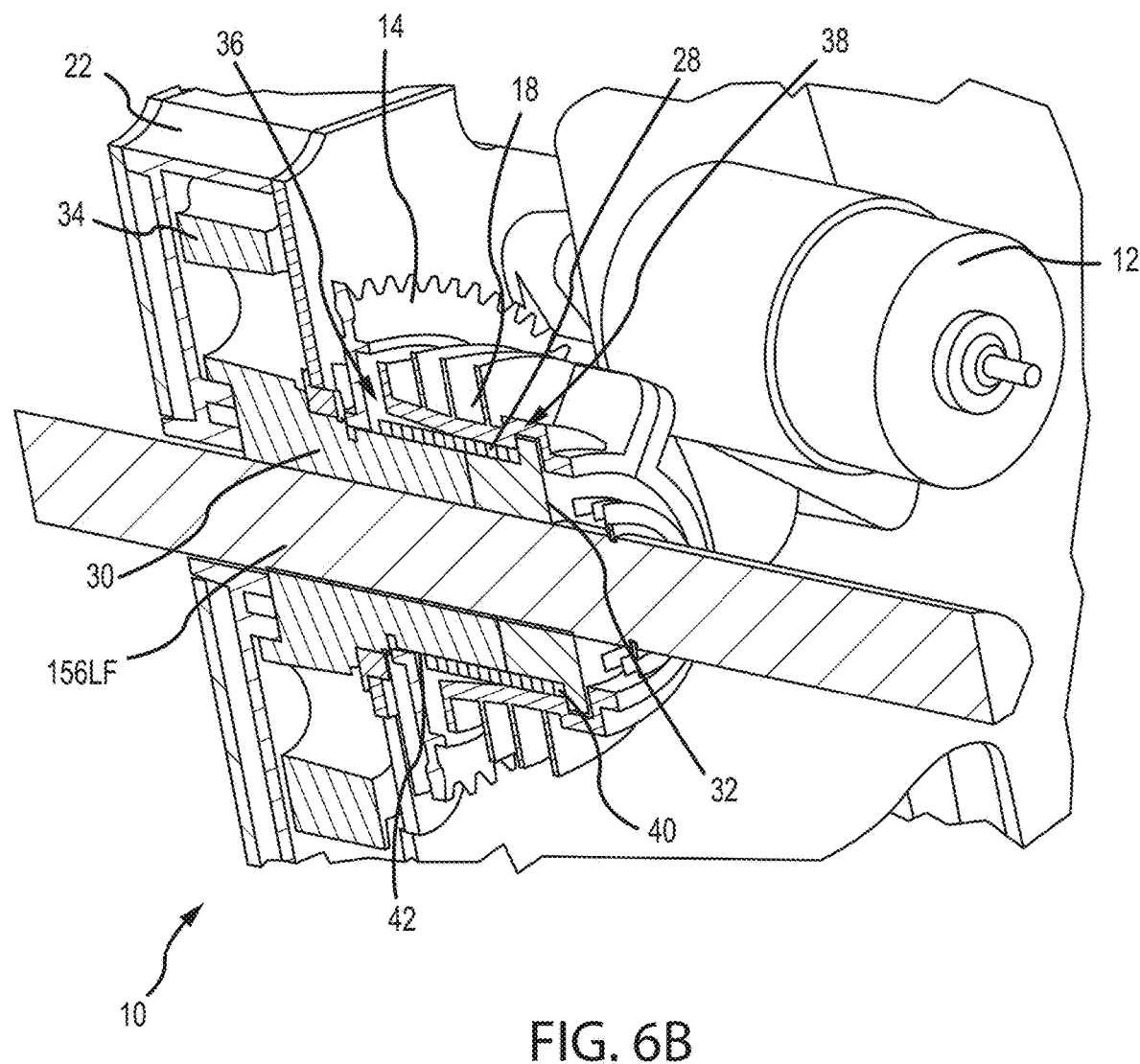

In at least one embodiment, spring wrap clutch assembly 10 selectively couples and decouples output shaft (e.g., lower fixed axis 156LF) to the input hub 30 and gear 34 (as shown in FIG. 6B). To further illustrate spring wrap clutch assembly 10, FIG. 6B illustrates a cross-sectional view thereof. As shown, girdle 18 at least partially surrounds or encompasses a torsion spring 28, which is wrapped around two hubs, an input hub 30 and an output hub 32. Input hub 30 extends from drive gear 34, which is driven by drive motor 26 via one or more engaged gears in gear box 22.

The term "input shaft" may be used generally herein to described one or more mechanisms directly driven by drive motor 26, for example via one or more engaged gears within gear box 22. In the illustrated embodiment, the "input shaft" includes input hub 30, which extends from drive gear 34. In one or more other embodiment, any combination of a shaft, hub, or drive gear may be driven alone or in combination by drive motor 26. For example, in at least one embodiment, a drive gear may directly engage an input shaft, either with or without input hub 30. In the embodiment illustrated in FIG. 6B, drive gear 34 and input hub 30 are selectively driven, in this case rotated, via drive motor 26, and output hub 32 extends at least partially through input hub 30 and drive gear 34 without engaging input hub 30 or drive gear 34. Output hub 32 may be axially aligned with input hub 30. While input shaft 16 passes through drive gear 34 and input hub 30 in the illustrated embodiment, this may not be the case in one or more other embodiments.

Output hub 32 may be fixed to the lower fixed axis 156LF so that the rotation of output hub 32 causes the lower fixed axis 156LF to rotate therewith, and thereby drive rotation of the hinge mechanism 152. As mentioned above and as described in greater detail below, the motorized rotation of the hinge mechanism 152 may be actuated in response to the upper assembly being within a proximity threshold of the lower assembly. In various embodiments, and with specific reference to FIG. 6C, gear box 22 is supported about output shaft (i.e., lower fixed axis 156LF), with an opposing side of the gear box 22 supported by a force transducer 164. As the drive motor 26 drives rotation of the hinge mechanism 152 via the lower fixed axis 156LF, the entire gear box 22, which may be free of rigid attachment to the base housing 151 of the base assembly 150, may tend to rotate about the lower fixed axis 156LF, which may cause the side of the gear box 22 to rotate downward. The force transducer 164 may restrain the gear box from rotating/torquing. The force transducer 164 may be configured to detect/measure a force signal which is indicative of a magnitude of the compressive force exerted on the workpiece between the heat plate 120 of the upper assembly 110 and the platen 191 of the lower assembly 190. As described in greater detail below, the readings from the force transducer 164 may be used by a controller to provide active feedback control to the drive motor 26 in order for the heat press 100 to produce a predetermined, desired compressive force.

In various embodiments, output hub 32 may be integrally formed with the output shaft (i.e., lower fixed axis 156LF) as a single piece such that output hub 32 is an extension of output shaft (i.e., lower fixed axis 156LF). In at least one embodiment, hubs 30, 32 may not be used and instead, axially aligned input and output hubs may be directly engaged by torsion spring 28. In the illustrated embodiment, input and output hubs 30, 32 effectively increase the diameter beyond output shaft such that the larger moment arm reduces the force required to rotate the output shaft (i.e., the lower fixed axis 156LF). In this way, the frictional force between torsion spring 28 and hubs 30, 32 required for coupling and rotating hubs 30, 32 together may be reduced when torsion spring 28 is wound tightly against both hubs 30, 32.

In at least one embodiment, girdle 18 is tapered outwardly away from input hub 30 at a first end 36 of girdle 18. A second end 38 of girdle 18 may be un-tapered and/or dimensioned such that girdle 18 presses torsion spring 28 against an outer surface 40 of output hub 32 to engage torsion spring 28 with output hub 32. Because first end 36 of girdle 18 tapers outwardly, girdle 18 may not press torsion spring 28 against input hub 30 when torsion spring 28 is not wound tightly against an outer surface 42 of input hub 30. However, girdle 18 may still play a role in containing torsion spring 28 around input hub 30 in whatever configuration torsion spring 28 is in, whether it be wound or un-wound.

Accordingly, when torsion spring 28 is un-wound or loose, input hub 30 may freely rotate without engaging torsion spring 28 and vice versa. However, even when/if torsion spring 28 is un-wound, girdle 18 couples torsion spring 28 with output hub 32 such that torsion spring 28 and output hub 32, and therefore output shaft (i.e., the lower fixed axis 156LF), rotate together. Thus, in a decoupled configuration, as shown in FIG. 6B, spring wrap clutch assembly 10 includes input hub 30 that may be rotated independently of output shaft (i.e., lower fixed axis 156LF).

The lag-time associated with winding torsion spring 28 tightly to engage both input hub 30 and output hub 32 is reduced because torsion spring 28 is already pressed/held against output hub 32 before torsion spring 28 is wound tightly to couple output hub 32 with input hub 30. In effect, in at least one embodiment, the time required to wind torsion spring 28 until input hub 30 and output hub 32 are coupled (in other words the "lag time" discussed above) is reduced by the time it would otherwise have taken to wind torsion spring 28 around output hub 32 if torsion spring 28 had not already been held against output hub 32 by girdle 18.

Figure 6C:
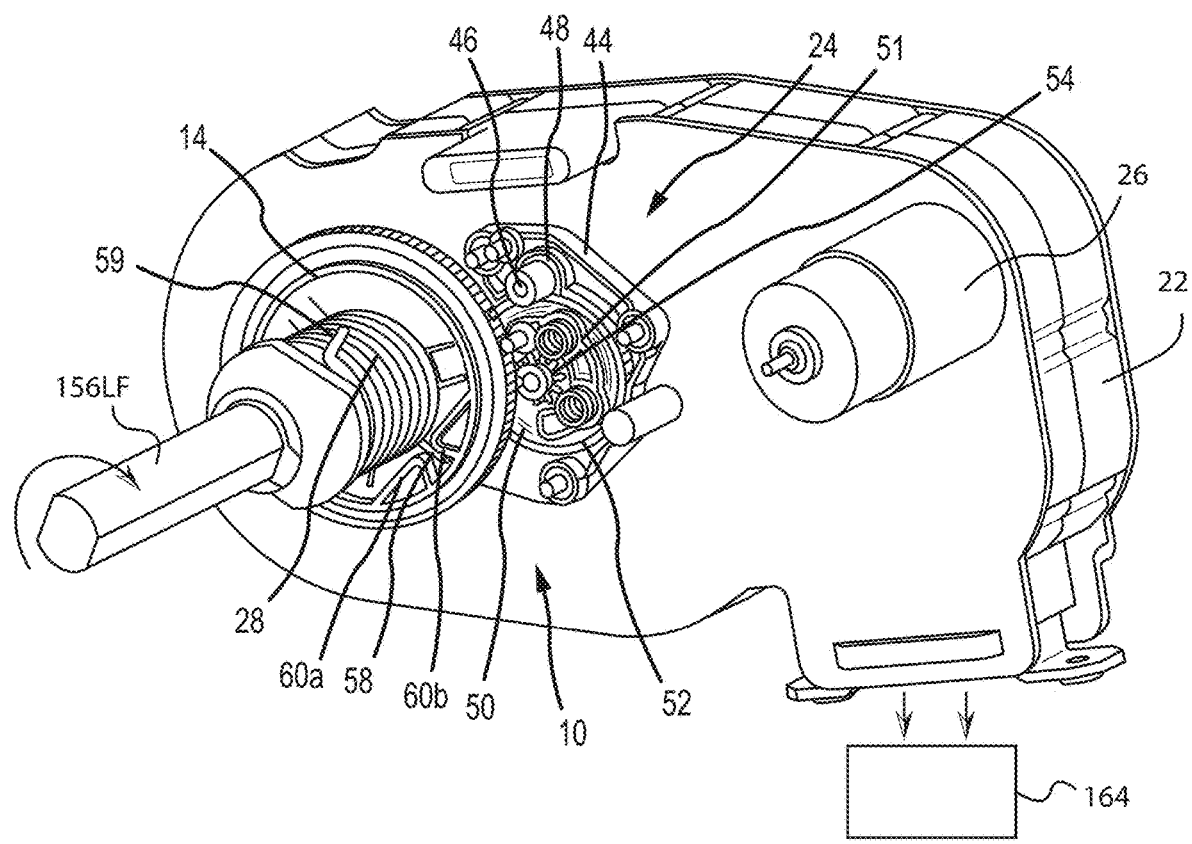

In addition, spring wrap clutch assembly 10 includes several other features to reduce lag time and provide a smooth engagement and disengagement of input hub 30 and output shaft (e.g., lower fixed axis 156LF). FIG. 6C, which shows an embodiment of a spring wrap clutch assembly 10 with motor mount 20 and clutch motor 12 removed for visualization purposes, illustrates at least some of these features. For example, at least one embodiment of spring wrap clutch assembly 10 includes planetary arm assembly 24, which includes a planetary arm 44 rotatable about a pivot 46. Planetary arm assembly 24 may also include pinion gear 48, compound gear 50, and brake pad 51 that each rotate with planetary arm 44 as planetary arm 44 selectively rotates around pivot 46. Compound gear 50 includes an outer gear 52 and an inner gear 54, with inner gear 54 being smaller than outer gear 52 in at least one embodiment.

In addition, at least one embodiment of spring wrap clutch assembly 10 includes a clutch output gear 14 positioned coaxially with torsion spring 28. In at least one embodiment, clutch output gear 14 is aligned generally coplanar with inner gear 54 of compound gear 50. Also, clutch output gear 14 is configured to engage with a tang 58 of torsion spring 28 such that the rotation of either torsion spring 28 or clutch output gear 14 causes the rotation of the other. The clutch output gear 14 may engage with tang 58 in any way that ensures both rotate together. For example, in at least one embodiment, tang 58 may be glued, screwed, molded together with, or otherwise affixed to clutch output gear 14. In at least one embodiment, torsion spring 28 may not include tang 58 but rather be directly engaged with the end of the coil adjacent to the circular face of clutch output gear 14 in one or more of the ways mentioned above.

In at least one embodiment, torsion spring 28 may engage or be fixed to clutch output gear 14 via one or more mechanical connections or interlocks. For example, in at least one embodiment as shown in at least FIG. 6C of the present disclosure, clutch output gear 14 includes at least two opposing raised features 60a, 60b between which tang 58 may be disposed. The shape and position of each raised feature 60a, 60b may vary in one or more other embodiments, but as shown may extend from the circular surface of clutch output gear 14. In such an embodiment, raised features 60a, 60b, which may generally be disposed coplanar with tang 58, push tang 58 one way or the other depending on the direction of rotation of clutch output gear 14, which will either wind or unwind torsion spring 28 accordingly.

Alternatively, in at least one embodiment, spring wrap clutch assembly 10 may include one or more other means of engaging tang 58 with clutch output gear 14, including one or more mechanical and/or electro-mechanical devices. For example, in at least one embodiment, spring wrap clutch assembly 10 may include a solenoid attached at input hub 30, clutch output gear 14, or other component to selectively engage tang 58 and lock it in position with clutch output gear 14.

In the illustrated embodiment described herein, when torsion spring 28 is wound down against input hub 30, tang 58 is rotated near where girdle 18 is not restricting the movement of torsion spring 28 or tang 58. Because girdle 18 fixes the position of torsion spring 28 against output hub 32, the relative rotation of tang 58 causes the winding or unwinding of torsion spring 28. In one or more other embodiments, torsion spring 28 also includes tang 59, shown in FIG. 6C, which may be fixed in position, either by girdle 18 or by some other mechanism, such that the winding and unwinding of torsion spring 28 depends on the rotation of tang 58.

When spring wrap clutch assembly 10 is in a decoupled configuration, inner gear 54 is not engaged with clutch output gear 14. As noted above, in the decoupled configuration, torsion spring 28 is not wound tightly against input hub 30 and thus drive motor 26 is not configured to rotate output shaft (i.e., the lower fixed axis 156LF). In this configuration, output the lower fixed axis 156LF may be freely rotated regardless of the on/off state of drive motor 26 or the motion of input gear 34 and input hub 30 (e.g., manual movement of upper assembly 110).

During an operation of spring wrap clutch assembly 10, clutch motor 12 (FIG. 6B) may selectively rotate pinion gear 48. The direction of rotation of pinion gear 48 and resulting rotations of other engaged gears of planetary arm assembly 24 and clutch output gear 14 may differ in one or more other embodiments depending on the orientation and relative positions of the various gears. However, in at least one embodiment, clutch motor 12 may rotate pinion 48 clockwise so that compound gear 50 rotates counterclockwise. In at least one embodiment, when compound gear 50 rotates counterclockwise, the friction of compound gear 50 rotating about compound gear axle 62 at least partially contributes to a torque acting on planetary arm assembly 24, causing planetary arm 44 and compound gear 50 to rotate clockwise about pivot 46. In at least one embodiment, brake pad 51 may also act as a resistive frictional force to contribute to the clockwise rotation of planetary arm assembly 24 about pivot 46.

Figure 6D:
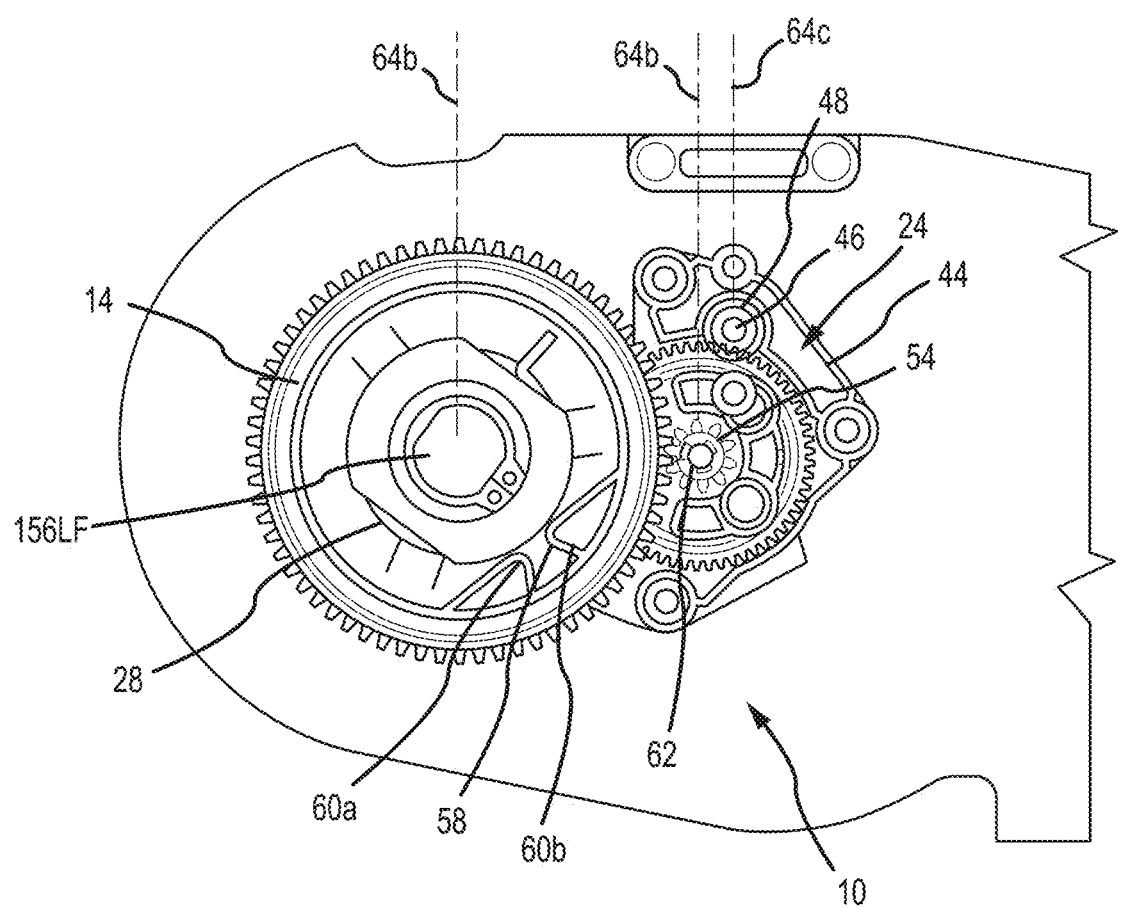

When clutch motor 12 rotates pinion gear 48, causing planetary arm assembly 24 to rotate clockwise about pivot 46, as noted above, inner gear 54 is urged toward clutch output gear 14. In this way, the selective activation or turning of clutch motor 12 engages inner gear 54 with clutch output gear 14, as shown in FIG. 6D. Once engaged, as compound gear 50 continues to be rotated counterclockwise, clutch output gear 14 rotates clockwise. When clutch output gear 14 rotates clockwise, raised feature 60b of clutch output gear 14 urges tang 58 clockwise. Because the opposing end of torsion spring 28 is fixed, moving tang 58 clockwise tightens torsion spring 28 against input hub 30, thus coupling input hub 30 with output hub 32 and therefore output shaft (e.g., lower fixed axis 156LF).

In this way, in at least one embodiment, torsion spring 28 may be actively rotated to tighten down on input hub 30 faster than drive motor 26 rotates input hub 30. Thus, the lag time associated with coupling input hub 30 with output shaft (e.g., lower fixed axis 156LF), as discussed above, is reduced. That is, in at least one embodiment where the rotation of clutch output gear 14 outpaces the rotation of input hub 30, both of which rotate in the same direction during operation of clutch motor 12, spring wrap clutch assembly 10 tightens torsion spring 28 around input hub 30 faster than a tang 58 would if engaged with one or more components rotating at the same rate as input hub 30 as driven by drive motor 26.

In addition to the frictional forces that urge planetary arm 44 clockwise so that compound gear 50 and inner gear 54 engage clutch output gear 14, forces between the teeth of inner gear 54 and clutch output gear 14 tend to keep inner gear 54 engaged with clutch output gear 14, even with minimal forces from clutch motor 12. In at least one embodiment, this may at least in part be due to the relative position of inner gear 54 and pivot 46 in the engaged/coupled configuration shown in FIG. 6D. For example, because compound gear axle 62 is below pivot 46 and because a vertical axis 64a running through compound gear axle 62 is positioned between a vertical axis 64b running through the rotation point of clutch output gear 14 and a vertical axis 64c running through pivot 46, the upward forces on the gear teeth of inner gear 54 resulting from those teeth pushing downward on the teeth of clutch output gear 14, urge planetary arm 44 (to which compound gear axle 62 is fixed) to rotate clockwise. This clockwise urging of planetary arm 44 contributes to maintaining the engagement of inner gear 54 with clutch output gear 14 during operation.

In addition, because clutch output gear 14 can freely rotate before and after inner gear 54 is engaged therewith, subject of course to the force of tang 58 from torsion spring 28, the teeth of inner gear 54 tend to grab and align the teeth of clutch output gear 14 with the teeth of inner gear 54 as inner gear 54 approaches clutch output gear 14 before full engagement. This results in smooth and consistent initial engagement between inner gear 54 and clutch output gear 14. Furthermore, in at least one embodiment as seen in the figures, raised portions 60a, 60b are separated at a distance greater than a thickness of tang 58 to allow some independent movement of clutch output gear 14 relative to tang 58 so that an initial movement of clutch output gear 14, for example when the teeth of inner gear 54 first contact the teeth of clutch output gear 14, may occur free of any resistance from torsion spring 28. The distance separating raised portions 60a, 60b may vary in one or more embodiments to allow varying degrees of independent rotation between clutch output gear 14 and torsion spring 28 to allow the smooth and consistent engagement of the teeth of inner gear 54 and the teeth of clutch output gear 14 while clutch output gear 14 is free to rotate independently, as described above.

In order to release or decouple, clutch motor 12 is simply, and selectively driven in the opposite direction, or in the illustrated embodiment, counterclockwise, to rotate planetary arm assembly 24 counterclockwise, which moves inner gear 54 away from clutch output gear 14.

This leaves clutch output gear 14 disengaged from inner gear 54 and free to rotate counterclockwise as urged by tang 58 pushing against raised portion 60a as coil 28 naturally unwinds to a lower state of energy. This may be accomplished because, in at least one embodiment, clutch output gear 14 is not fixed with or coupled to any other hub, gear, or shaft of the system. Advantageously, the active release of planetary arm assembly 24, and thus the active disengagement of inner gear 54 from clutch output gear 14 allows clutch output gear 14 to rotate and allow torsion spring 28 to unwind without the need to overcome any resistance torque from clutch motor 12, drive motor 26, or any other frictional or torque resistance from planetary arm assembly 24 or any components thereof. This may result in a quick and consistent unwinding of torsion spring 28 and thus a decoupling of output shaft (e.g., lower fixed axis 156LF) from input hub 30 when clutch motor 12 is selectively reversed.

In at least one embodiment, clutch motor 12 may simply stop rotating pinion 48 instead of actively rotating it backward to disengage inner gear 54 from clutch output gear 14. In such an embodiment, the release/unwinding force of torsion spring 28 causes clutch output gear 14 to rotate counterclockwise, which in turn rotates inner gear 54/compound gear 50 clockwise, which in turn urges planetary arm assembly 24 counterclockwise due to friction in the various rotating components and axles/pivots 62, 46 thereof to separate inner gear 54 from clutch output gear 14. In such an embodiment, the unwinding force of torsion spring 28 may also be enough to overcome a resistance torque from clutch motor 12 when turned off.

In addition, in an embodiment where clutch motor 12 is not actively reversed but rather turned off when decoupling input hub 30 from output shaft (e.g., lower fixed axis 156LF), torsion spring 28 only needs to overcome the resistive forces of planetary arm assembly 24 briefly until inner gear 54 disengages clutch output gear 14. Once planetary arm assembly 44 is rotated counterclockwise by torsion spring 28 just enough to separate the teeth of inner gear 54 from the teeth of clutch output gear 14, torsion spring 28 is free to unwind with clutch output gear 14 disengaged.

Additionally, or alternatively, to disengage inner gear 54 from clutch output gear 50 when disengagement is desired, at least one embodiment includes a separation spring (not shown) that biases inner gear 54 away from clutch output gear 50. For example, in at least one embodiment, a radial spring may be disposed around pivot 46 to bias planetary arm 44 counterclockwise until clutch motor 12 overcomes the force of the radial spring to rotate planetary arm 44 clockwise.

In various embodiments, the heat press may include one or more electronic circuits for sensing loss of AC power mains. In response to power loss detection, the heat press may be configured to provide a reserve amount of energy and control logic to disengage the mechanism holding the heat plate down. This reduces the risk of fire or overheating damage that could result if the heat plate was left in the closed/down position.

One or more other springs may also be utilized in various configurations to actively bias planetary arm 44, and thus inner gear 54, away from clutch output gear 50 when decoupling is desired. For example, in at least one embodiment, one or more constant force springs may be engaged with planetary arm 44 about pivot 46. In at least one embodiment, such a spring may include one or more coil springs configured to bias planetary arm 44 counterclockwise. Any number of springs or spring types, or combinations thereof, may be used to bias planetary arm 44 counterclockwise so that inner gear 54 is biased away from clutch output gear 14 when clutch motor 12 is not activated.

The size and configuration of the various gears of planetary arm assembly 24, including pinion gear 48, and compound gear 50 having outer gear 52 and inner gear 54, may be configured such that the torque necessary to rotate clutch output gear 14 is low enough for clutch motor 12 to handle. In addition, the size and configuration of these gears may be such that torques and forces of planetary arm assembly 24 resisting the counterclockwise rotation of planetary arm assembly 24 do not prevent the separation of inner gear 54 from clutch output gear 14 upon a deactivation of clutch motor 12. In at least one alternative embodiment of spring wrap clutch assembly 10, pinion gear 48 may be directly engaged with clutch output gear 14 without planetary arm assembly 24 and associated other gears present. In this way, clutch motor 12 selectively drives pinion gear 48, which directly drives clutch output gear 14 to selectively couple input hub 30 with output shaft (e.g., lower fixed axis 156LF). To decouple output shaft (e.g., lower fixed axis 156LF) from input hub 30, torsion spring 28 may drive clutch output gear 14 counterclockwise against the resistance of engaged pinion gear 48 and clutch motor 12 upon a deactivation of clutch motor 12.

Embodiments of spring wrap clutch 10 described herein advantageously reduce the lag time between the activation of spring wrap clutch 10 and the coupling of input hub 30 with output shaft (e.g., lower fixed axis 156LF). In addition, embodiments of spring wrap clutch 10 described herein enable quick and consistent de-coupling of output shaft (e.g., lower fixed axis 156LF) from input hub 30. As noted above, the advantages of reduced lag-time and the quick release of spring wrap clutch 10 are especially pronounced when employed in slow rotation applications.

To recap the description above as it pertains to heat press 100, heat press 100 may include drive motor 26 configured to drive the upper assembly 110 toward the lower assembly to exert a compressive force on the workpiece 108 disposed between the heat plate 120 and the platen 191. The force transducer 164 (FIG. 6C) may be configured to generate a measured force signal indicative of a magnitude of the compressive force. The gear box 22, which is coupled to the drive motor 26 for driving rotation of the lower fixed axis 156LF, is not rigidly mounted to the base housing 151, and instead may be merely mounted via its engagement with the lower fixed axis 156L. Accordingly, driving rotation of the lower fixed axis 156LF produces a resultant torque on the gear box 22, especially the end of the gear box 22 opposite the lower fixed axis 156LF. This end of the gear box may be supported by the force transducer 164, and the readings from the force transducer, caused by torquing the gear box about the lower fixed axis 156LF, are indicative of the magnitude of the compressive force on the workpiece.

In various embodiments, as described in greater detail below with reference to FIGS. 13A and 13B, the controller 300 (or other computing apparatus) may be configured to receive the measured force signal from the force transducer and provide closed-loop feedback control to the drive motor 26, based on the measured force signal, to exert a desired compressive force on the workpiece between the heat plate 120 and the platen 191. In various embodiments, the desired compressive force is a predetermined and substantially constant force. That is, the heat press 100 may be configured with force feedback control, helping the heat press 100 to provide a substantially constant and/or uniform compressive force. As mentioned above, the heat press 100 may include a clutch device or a clutch assembly configured to selectively connect the drive motor in torque transmitting engagement with the hinge mechanism 152.

Figure 7:
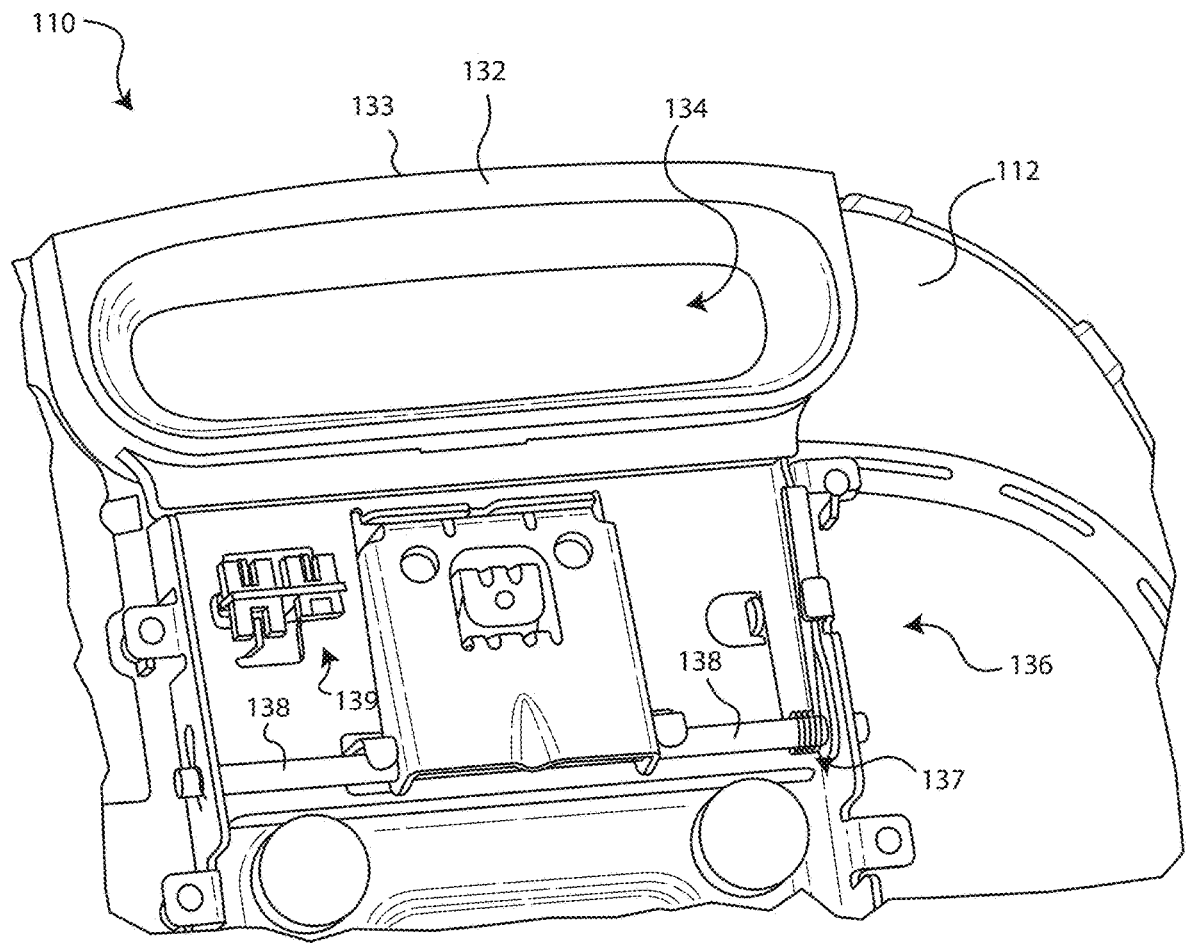
FIG. 7 is a top perspective view of an upper assembly of a heat press with a top section of an upper housing removed in order to show a handle and a handle connection structure, in accordance with various embodiments.
Figure 8:
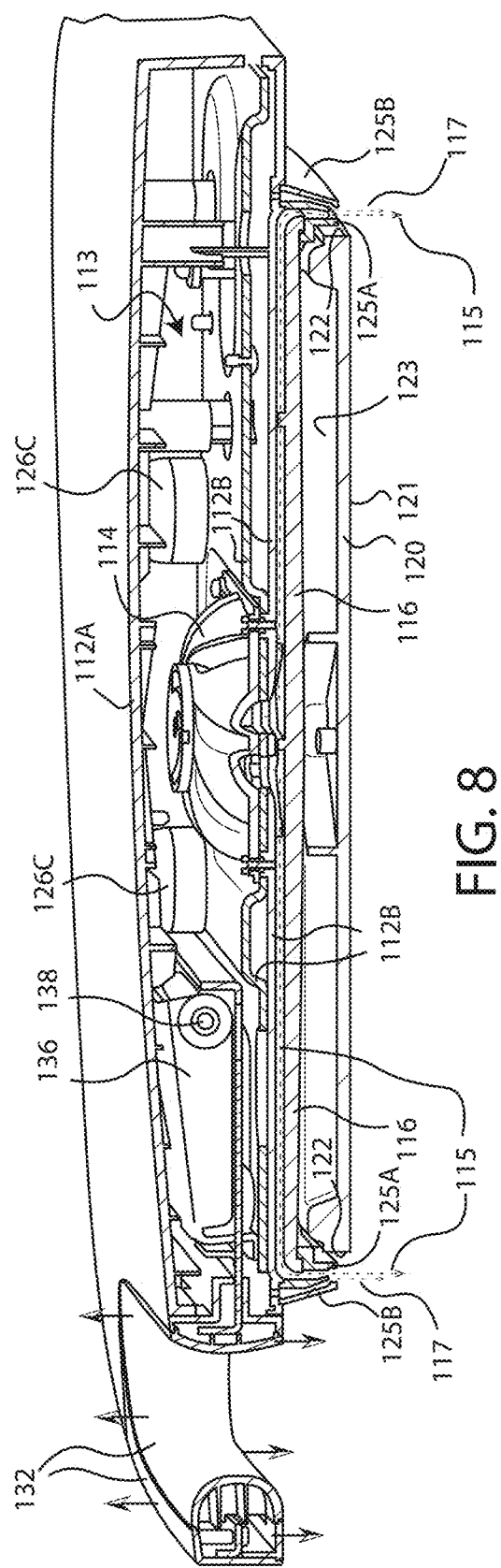
FIG. 8 is a cross-sectional perspective view of an upper assembly of a heat press, showing an active cooling system, in accordance with various embodiments.

In various embodiments, and with reference to FIGS. 7 and 8, the upper assembly 110, having the handle 132 substantially continuous with the upper housing 112, may be coupled to the upper housing 112 via a connection structure 136. The connection structure 136 may be configured to enable limited movement of the handle 132 relative to the upper housing 112. As shown on the left side of FIG. 8, the connection structure 136 for the handle 132 may be configured to enable bi-directional movement of the handle 132 relative to the upper housing 112 in response to user-applied force on the handle 132. The connection structure 136, for example, may include a spring mechanism 137 (e.g., a coil spring) engaged around a shaft 138, and the spring mechanism 137 may be configured to bias the handle 132 to a default position (FIG. 8) in which the exterior surfaces of the handle 132 are substantially continuous and aligned with adjacent exterior surfaces of the upper housing 112.

Said differently, the spring mechanism 137 and the shaft 138 may enable the handle 132 to be moved, in response to sufficient force on the handle 132, to move slightly relative to, and out of alignment with, the surrounding upper housing 112. The movement occurs when the user-applied force overcomes the spring-force of the spring mechanism 137. The extent of movement may be limited by the handle engaging/contacting structural stops of the upper assembly 110. In various embodiments, the force on the handle 132 (e.g., in a direction substantially perpendicular to the heat plate 120) that is required for the handle 132 to move relative to the upper assembly 110 (and thereby register as an "actuation") is between about 2 and 6 pounds of force. In various embodiments, this force at the handle 132 is about 4 pounds. As used in this context only, the term "about" refers to plus or minus 0.5 pounds.

The spring mechanism 137 of the connection structure 136 may be configured to return the handle 132 to the default position in response to remove of the user-applied force. In various embodiments, the arrows shown in FIG. 8 are indicative of the maximum travel, in either direction, experienced by the handle 132 in response to a user's manual input force. The connection structure 136 may include a handle position sensor 139 that is configured to detect the movement of the handle 132 relative to the upper housing 112. The detected movement from the handle position sensor 139 may be communicated to the controller 300 and, as described in greater detail below, operation of the drive motor 26 may be activated, deactivated, and/or modulated in response to the detected movement of the handle 132. Thus, the handle 132 may function as a user input mechanism (i.e., an actuator) for operation of the heat press 100.

Figure 9:
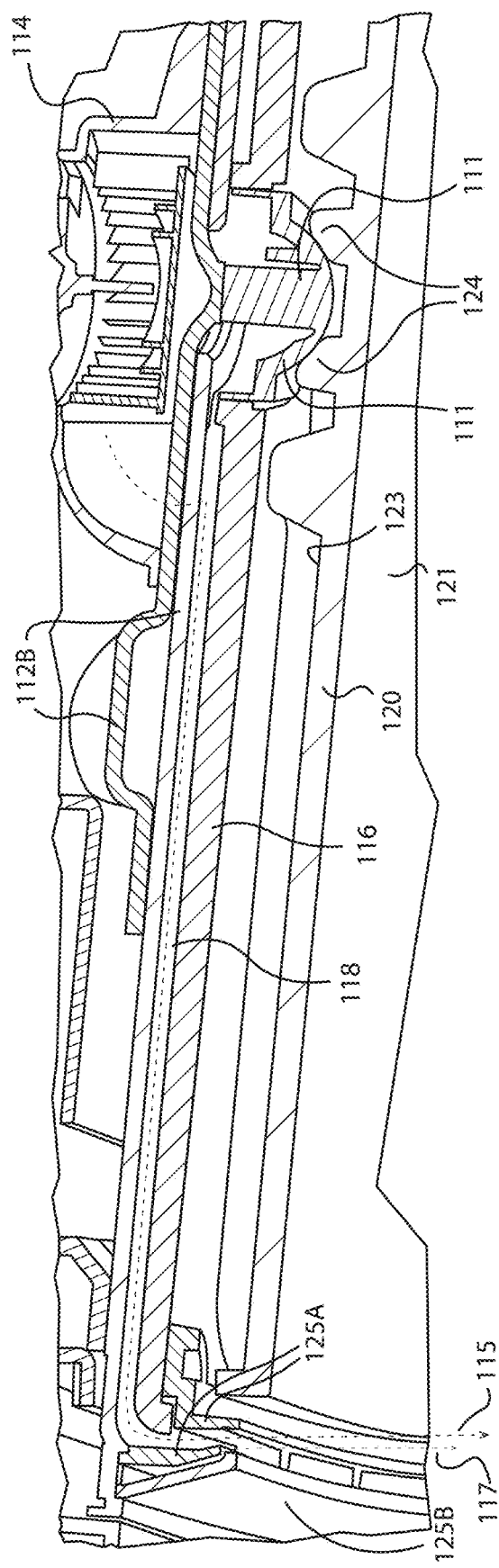
FIG. 9 is a cross-sectional perspective view of an upper assembly of a heat press, showing a portion of a gimbal structure, in accordance with various embodiments.

In various embodiments, and with reference to FIGS. 8 and 9, the upper assembly 110 comprises an active cooling system for transferring heat away from the upper assembly 110. In various embodiments, the upper assembly 110 includes a fan 114 configured to provide active cooling to the upper assembly 110. The upper housing may have a first upper housing 112A (e.g., a top upper housing) and a second upper housing 112B (a bottom upper housing), and an upper chamber 113 may be defined between the first upper housing 112A and the second upper housing 112B. The fan 114 may be generally disposed within the upper chamber 113. For example, the fan 114 may be coupled/mounted to the second upper housing 112B. The upper assembly 110 may include one or more insulation layers 116 generally disposed between the heat plate 120 and the second upper housing 112B and/or the fan 114. One or more air gaps may be defined between the heat plate 120 and the insulation layer 116, and between the insulation layer 116 and the second upper housing 112B. The upper chamber 113 may also be an air gap, thus helping to isolate the heat from the heat plate 120 from the first upper housing 112A, and thus helping to maintain the first upper housing 112A cool to touch for the user.

The fan 114 may be configured to direct air (i.e., driven air 115) from the upper chamber 113 into a cooling channel 118 (i.e., one of the air gaps/channels) defined between the second upper housing 112B and the insulation layer 116. The fan 114 may be centrally located relative to a footprint of the heat plate 120, and the cooling channel 118 may be configured to direct the driven air 115 radially outward from the centrally located fan toward a perimeter 122 of the heat plate 120. The cooling channel 118 is configured to direct the driven air 115 to exit the upper assembly 110 at/adjacent the perimeter 122 of the heat plate 120. In various embodiments, the upper assembly 110 includes an inner skirt 125A circumscribing the perimeter 122 of the heat plate 120 and configured to direct the driven air 115 away from the heat plate 120. The skirt 125A may be configured to direct the driven air 115 away from the heat plate 120 in a direction that is substantially perpendicular to the engagement surface 121 of the heat plate 120.

In various embodiments, the skirt 125A is configured to throttle the driven air 115 to increase its velocity. For example, the skirt 125A may have a plurality of nozzles or apertures configured to reduce the cross-section of the airflow channel, and thus increase the velocity of the driven air 115 as it exits the upper assembly 110. The jet of driven air 115 exiting the upper assembly 110 not only draws/pushes heat away from heat plate 120 around the perimeter 122 but may also entrain surrounding cool air to further improve heat dissipation. Entrained air 117 may simply flow around the upper assembly 110, or in alternative embodiments the upper assembly 110 may include an outer skirt 125B, disposed radially outward of the inner skirt 125A, and this outer skirt 125B may help direct the entrained air (e.g., may direct air from the upper chamber 113). The jet of driven air 115, with or without entrained air 117, has sufficient velocity to push heat away from the heat plate 120 and away from the handle 132 when the heat press is in the open position. Accordingly, this perimeter jet of cooling air can form a curtain of cooling air around the heat plate 120 that directs heat away from the upper assembly, thereby inhibiting the handle 132 from heating up and helps keep the handle 132 and the upper housing 112 safe to touch. Such a configuration (i.e., active cooling of heat plate with integrated handle) enables portions of the upper housing 112 to be made from plastics or other materials that do not need to comply with high temperature requirements. For example, the upper housing 112 may be made from polycarbonate or other such plastics, while the skirt 125A and other sections near the heat plate 120 may need to be made from heat resistant materials, such as polyphenylene sulfide ("PPS").

Figure 10:
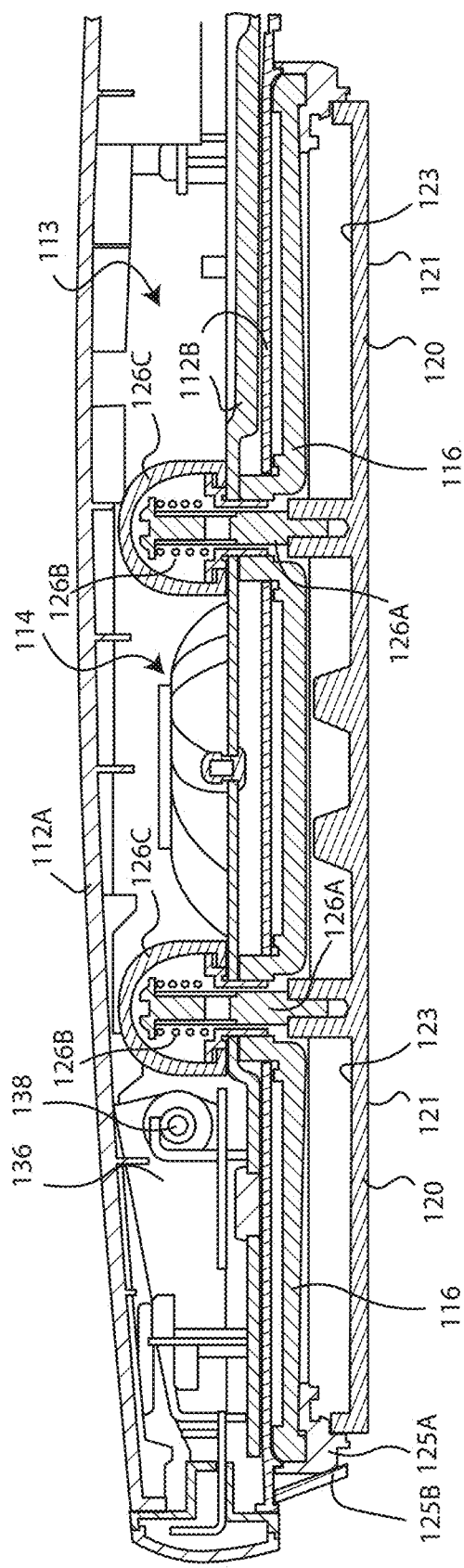
FIG. 10 is a cross-sectional perspective view of an upper assembly of a heat press, showing a portion of a gimbal structure, in accordance with various embodiments.

In various embodiments, and with reference to FIGS. 9 and 10, the upper assembly 110 includes a gimbal structure. The heat plate 120 may be coupled to the upper housing 112 via the gimbal structure. The gimbal structure may be generally configured to allow for angling of the heat plate 120, relative to the upper housing 112, thereby allowing the heat plate to accommodate workpieces having different shapes and/or varying surface topographies. The gimbal structure may include, according to various embodiments, a plurality of spring-loaded anchors that are configured to enable the angling of the heat plate 120. The plurality of spring-loaded anchors may include a stud 126A a spring 126B disposed around the stud 126A on an upper/top side of the second upper housing 112B. The heat plate 120, being mounted to the upper assembly 110 via the spring-loaded anchors may angle relative to the upper housing 112. In various embodiments, the spring-loaded anchors may also include a cover 126C or a cap surrounding a top side of the spring-loaded anchor. The covers 126C may be made from a high-temperature polymer for extra insulation to keep heat from transferring up the spring-loaded anchors to the upper housing 112. In various embodiments, the upper assembly 110 comprises four spring-loaded anchors generally disposed around the centrally located fan 114.

In various embodiments, the gimbal structure also includes a pivoting ball engagement structure. Said differently, a rear surface 123 of the heat plate 120 may comprise a nest region 124 configured to receive a hemispherical boss 111 (e.g., a spherical, ball-shaped protrusion) of the second upper housing 112B, wherein the engagement of the hemispherical boss 111 within the nest region 124 enables rotation of the heat plate 120 relative to the second upper housing 112B. In various embodiments, the nest region 124 and the hemispherical boss 111 are centrally located relative to a footprint of the heat plate 120 (e.g., underneath and aligned with the fan 114).

FIG. 11 illustrates a perspective view of the controller 300, according to various embodiments. As mentioned above, the controller 300 may have a wired or wireless connection 301 with the heat press 100. The controller 300 may generally include one or more processors and a storage medium having instructions stored thereon. The one or more processors may be configured to implement various logical operations in response to execution of instructions, for example, instructions stored or loaded on the tangible, non-transitory, computer-readable medium configured to communicate with the controller. The system program instructions may include instructions that, in response to execution by a processor, cause the controller to control operation of the heat press 100. Instead of and/or in addition to the controller 300, the one or more processors and the storage medium may be integrated into the heat press 100 itself, and/or other devices may be coupled in wired or wireless control communication with the heat press 100, such as one or more servers, a laptop, a personal computer, a smartphone, etc. (see FIG. 12).

The controller 300 may include a housing 302 forming exterior side-walls of the device. The controller 300 may also include atop display 304. The housing 302 may be configured to support the display 304 at an angle relative to the table/supporting surface. In various embodiments, the controller 300 also includes one or more knobs 306 (e.g., two knobs). The user may interact with the knobs to change operation settings of the heat press 100. In various embodiments, the controller 300 comprises an aesthetic break 303 between the housing 302 and the display 304. The aesthetic break 303 comprises a change in material and/or color between the housing 302 and the display 304, according to various embodiments. For example, the housing 302 may be made from a light-colored plastic material and the display 304 may be a dark-colored screen. The display 304 may display operational settings of the heat press 100, and actuation of the knobs 306 may result in the changing operational settings being displayed on the display 304 above the respective knob 306, providing intuitive guidance to the user regarding use of the heat press 100.

FIG. 12 is schematic view of an example computing device 3000 that may be used to implement the systems and methods described in this document. The components 3010, 3020, 3030, 3040, 3050, and 3060 shown at FIG. 12, their connections and relationships, and their functions, are meant to be exemplary only, and are not meant to limit implementations of the inventions described and/or claimed in this document. As mentioned above, the various features and functionality of the computing device 3000 may be implemented in a standalone computer (e.g., the controller 300), may be integrated within the heat press itself, or may be implemented with various other computing devices, as described below.

The computing device 3000 includes a processor 3010, memory 3020, a storage device 3030, a high-speed interface 3040 connecting to the memory 3020 and high-speed expansion ports 3050, and a low-speed interface 3060 connecting to a low speed bus 3070 and a storage device 3030. Each of the components 3010, 3020, 3030, 3040, 3050, and 3060, are interconnected using various busses, and may be mounted on a common motherboard or in other manners as appropriate. The processor 3010 can process instructions for execution within the computing device 3000, including instructions stored in the memory 3020 or on the storage device 3030 to display graphical information for a graphical user interface (GUI) on an external input/output device, such as display 3080 coupled to high-speed interface 3040. In other implementations, multiple processors and/or multiple buses may be used, as appropriate, along with multiple memories and types of memory. Also, multiple computing devices 3000 may be connected, with each device providing portions of the necessary operations (e.g., as a server bank, a group of blade servers, or a multi-processor system).

The memory 3020 stores information non-transitorily within the computing device 3000. The memory 3020 may be a computer-readable medium, a volatile memory unit(s), or non-volatile memory unit(s). The non-transitory memory 3020 may be physical devices used to store programs (e.g., sequences of instructions) or data (e.g., program state information) on a temporary or permanent basis for use by the computing device 3000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random-access memory (DRAM), static random access memory (SRAM), phase change memory (PCM) as well as disks or tapes.

The storage device 3030 is capable of providing mass storage for the computing device 3000. In some implementations, the storage device 3030 is a computer-readable medium. In various different implementations, the storage device 3030 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 3020, the storage device 3030, or memory on processor 3010.

The high-speed interface 3040 manages bandwidth-intensive operations for the computing device 3000, while the low speed interface 3060 manages lower bandwidth-intensive operations. Such allocation of duties is exemplary only. In some implementations, the high-speed interface 3040 is coupled to the memory 3020, the display 3080 (e.g., through a graphics processor or accelerator), and to the high-speed expansion ports 3050, which may accept various expansion cards (not shown). In some implementations, the low-speed interface 3060 is coupled to the storage device 3030 and a low-speed expansion port 3090. The low-speed expansion port 3090, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

FIGS. 13A and 13B illustrate schematic flow chart diagrams of various exemplary methods 950, 960 for using a heat press. The disclosed methods 950, 960 are not exhaustive lists of the methods that may be performed with a heat press, and instead merely represent exemplary methods and steps. Indeed, the depicted methods 950, 960 may have additional steps, the steps from one method may be incorporated into the other, and other methods discussed below, but not present in the flow charts, also fall under the scope of this disclosure.

The method 950 may include activating, by a controller, a drive motor to drive an upper assembly of a heat press toward a lower assembly of the heat press at step 952. The method 950 may further include receiving, by the controller, a measured force signal from a force transducer at step 954.

Still further, the method 950 may include modulating, by the controller, the drive motor based on the measured force signal at step 956. The drive motor, according to various embodiments, may be coupled to a hinge mechanism of a base assembly of the heat press. In such embodiments, step 952 of activating the drive motor involves commencing movement of an upper assembly of the heat press toward a lower assembly to exert a compressive force on a workpiece disposed between a heat plate of the upper assembly and a platen of the lower assembly. Said differently, method 950 generally includes actively controlling and modulating a drive motor of a heat press based on force feedback from a force actuator to produce a desired compressive force between a heat plate and a platen of the heat press. In various embodiments, the desired compressive force is a predetermined and substantially constant force.

In various embodiments, method 960 includes receiving, by a controller handle position data from a handle position sensor at step 962. The method 960 may further include determining, by the controller and based on the handle position data, whether a user exerted an activating force of a deactivating force on the handle at step 964. In response to determining at step 964 that an activating force was exerted by the user, the method 960 may include activating, by the controller, a drive motor to drive an upper assembly of a heat press toward a lower assembly of the heat press at step 966. In response to determining at step 964 that a deactivating force was exerted by the user, the method 960 may include deactivating, by the controller, the drive motor. Said differently, method 960 generally pertains to relying on user exerted forces on a handle of a heat press to determine whether to activate or deactivate a drive motor.

In various embodiments, a method for a heat press may include receiving, by a controller, upper assembly position data from a hinge position sensor, wherein the upper assembly position data is indicative of a position of the upper assembly relative to the lower assembly. The method may further include determining, by the controller and based on the upper assembly position data, whether the upper assembly is within a predetermined threshold proximity to the lower assembly. In various embodiments, a step of activating, by the controller, the drive motor is performed in response to determination the upper assembly is within the predetermined threshold proximity to the lower assembly. Said differently, in various embodiments, the drive motor will not be activated unless two conditions are met: 1) the upper assembly is sufficiently close (e.g., within a proximity threshold) to the lower assembly (as determined by a position sensor—a hinge position sensor); and 2) the user has exerted an activating force (e.g., a downward force) on the handle, as detected by the handle position sensor. As mentioned above, the handle may be biased into a default position, and the manual exertion by the user on the handle may overcome this biasing force to move the handle downward relative to the upper housing, thus causing the handle position sensor to recognize a sufficient activating force. With these two conditions satisfied, the controller may execute a motorized compression and heating of a workpiece between the heat plate and the platen. In various embodiments, the method may also include deactivating, by the controller, the drive motor in response to at least one of a passage of a predetermined amount of time and determination of the deactivating force on the handle. Accordingly, in the event of an emergency, or if the user otherwise needs to suddenly cease the motorized compression of the workpiece, a lifting force exerted on the handle can cause the heat press to move to the open position.

In various embodiments, deactivating, by the controller, the drive motor comprises actuating, by the controller, a clutch device to disconnect the drive motor from torque transmitting engagement with the hinge mechanism. Prior to deactivating the drive motor, the method may include reversing the drive motor for a period of time or until the force has been sufficiently reduced before releasing the clutch. This may relax and/or release the stored energy in the heat press and may provide a "soft-opening." In various embodiments, activating, by the controller, the drive motor comprises actuating, by the controller, a clutch device to connect the drive motor in torque transmitting engagement with the hinge mechanism.

In various embodiments, the methods disclosed herein may also include additional steps, such as positioning a workpiece on the platen of the lower assembly and manually lowering the upper assembly of the heat press toward the lower assembly, wherein the upper assembly is pivotably coupled to the lower assembly via a hinge mechanism of a base assembly.

In various embodiments, a method for using a heat press may include determining, by the controller, a voltage at the machine (e.g., 120 VAC commonly used in North America or 230 VAC commonly used in other areas of the world). The method may also include modulating and/or switching which heating elements of multiple heat elements in the heating plate of the heat press are activated, thereby allowing the heat press to provide substantially uniform heating for either input AC voltage. This voltage monitoring functionality may thus include active configuring of the heating elements in response to detected input voltage instead of conventional approaches of merely making all components capable of withstanding higher input voltages.

In various embodiments, the terms utilized herein to describe methods for using a heat press may be similar or the same to terms utilized above in conjunction with heat press 100. As appropriate, the structural details of the components of such terms may be included in the methods to provide clarity to the methods. However, the method and steps disclosed herein are not necessarily limited to the structures and components mentioned above, as the utility and novelty of the method steps may stand independent of the structural details of the machine details.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Reference throughout this specification to features, advantages, or similar language does not imply that all the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure. Further, in some instances, well-known structures, materials, or operations are not shown or described in detail to avoid obscuring aspects of the subject matter of the present disclosure. No claim element is intended to invoke 35 U.S.C. 112(f) unless the element is expressly recited using the phrase "means for."

As used herein, the terms "including," "comprising," "having," and variations thereof mean "including but not limited to" unless expressly specified otherwise. Accordingly, the terms "including," "comprising," "having," and variations thereof are intended to cover a non-exclusive inclusion, such that a process, method, article, or apparatus that comprises a list of elements does not include only those elements but may include other elements not expressly listed or inherent to such process, method, article, or apparatus. An enumerated listing of items does not imply that any or all of the items are mutually exclusive and/or mutually inclusive, unless expressly specified otherwise.

Further, in the detailed description herein, references to "one embodiment," "an embodiment," "some embodiments," "various embodiments," "one example," "an example," "some examples," "various examples," "one implementation," "an implementation," "some implementations," "various implementations," "one aspect," "an aspect," "some aspects," "various aspects," etc., indicate that the embodiment, example, implementation, and/or aspect described may include a particular feature, structure, or characteristic, but every embodiment, example, implementation, and/or aspect may not necessarily include the particular feature, structure, or characteristic. Moreover, such phrases are not necessarily referring to the same embodiment, example, implementation, or aspect. Thus, when a particular feature, structure, or characteristic is described in connection with an embodiment, example, implementation, and/or aspect, it is submitted that it is within the knowledge of one skilled in the art to affect such feature, structure, or characteristic in connection with other embodiments, examples, implementations, and/or aspects, whether or not explicitly described. Absent an express correlation to indicate otherwise, features, structure, components, characteristics, and/or functionality may be associated with one or more embodiments, examples, implementations, and/or aspects of the present disclosure. After reading the description, it will be apparent to one skilled in the relevant art how to implement the disclosure in alternative configurations.

The scope of the disclosure is to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. Further, the term "plurality" can be defined as "at least two." As used herein, the phrase "at least one of", when used with a list of items, means different combinations of one or more of the listed items may be used and only one of the items in the list may be needed. The item may be a particular object, thing, or category. Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A, B, and C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

All ranges and ratio limits disclosed herein may be combined. Numbers, percentages, ratios, or other values stated herein are intended to include that value, and also other values that are "about" or "approximately" the stated value, as would be appreciated by one of ordinary skill in the art encompassed by embodiments of the present disclosure, unless otherwise defined herein. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

Different cross-hatching may be used throughout the figures to denote different parts but not necessarily to denote the same or different materials. Surface shading lines may be used throughout the figures to denote different parts or areas but not necessarily to denote the same or different materials. In some cases, reference coordinates may be specific to each figure. Furthermore, the connecting lines shown in the various figures contained herein are intended to represent exemplary functional relationships and/or physical couplings between the various elements. It should be noted that many alternative or additional functional relationships or physical connections may be present in a practical system.

Any reference to attached, fixed, connected or the like may include permanent, removable, temporary, partial, full and/or any other possible attachment option. Additionally, any reference to without contact (or similar phrases) may also include reduced contact or minimal contact. In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

The schematic flow chart diagrams included herein are generally set forth as logical flow chart diagrams. As such, the depicted order and labeled steps are indicative of one or more embodiments of the presented method. The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Furthermore, no element, component, or method step in the present disclosure is intended to be dedicated to the public regardless of whether the element, component, or method step is explicitly recited in the claims.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A heat press comprising:
   an upper assembly comprising a heat plate;
   a lower assembly comprising a platen;
   a base assembly interconnecting the upper assembly to the lower assembly;
   a drive motor that is configured to move the upper assembly relative to the lower assembly;
   a first handle forming a front edge of the heat press; and
   a second handle defined on a side of the heat press, wherein the second handle is configured to enable a user to lift and/or tote the heat press;
   wherein the heat press is configured to heat and compress, between the heat plate and the platen, a workpiece; and
   wherein the heat plate is coupled to an upper housing via a gimbal structure comprising four spring-loaded anchors, wherein the four spring-loaded anchors are disposed around a central location of the heat plate and are configured to enable angling of the heat plate relative to the upper housing in response to a shape of a workpiece compressed between the heat plate and the platen.

2. The heat press of claim 1, further comprising a force transducer, wherein the force transducer is configured to generate a measured force signal indicative of a magnitude of a compressive force exerted against the workpiece during operation of the heat press.

3. The heat press of claim 2, further comprising a controller coupled in control communication with the drive motor and the force transducer, wherein the controller is configured to receive the measured force signal from the force transducer and provide closed-loop feedback control to the drive motor, based on the measured force signal, to exert a desired compressive force on the workpiece between the heat plate and the platen.

4. The heat press of claim 1, wherein the second handle is defined as a downward facing recess in a housing of the heat press.

5. The heat press of claim 1, wherein in an open position a front edge of the heat plate is rearward of a rear end of the platen.

6. The heat press of claim 1, wherein the drive motor is configured to move the upper assembly relative to the lower assembly in a translational motion regime.

7. The heat press of claim 6, wherein in the translational motion regime, the upper assembly is configured to translate toward the lower assembly, with the heat plate and the platen remaining substantially parallel to each other during translation.

8. The heat press of claim 1, further comprising a fan mounted to the upper assembly and configured to provide active cooling to the upper assembly.

9. The heat press of claim 8, wherein the upper assembly comprises a first upper housing and a second upper housing, wherein an upper chamber is defined between the first upper housing and the second upper housing, and the fan is disposed in the upper chamber.

10. The heat press of claim 9, wherein an insulation layer is disposed between the fan and the heat plate.

11. The heat press of claim 10, wherein the fan is configured to direct air from the first upper chamber downward toward the insulation layer and the heat plate.

12. The heat press of claim 1, wherein a rear surface of the heat plate comprises a nest region centrally located relative to a footprint of the heat plate, wherein the upper housing comprises a spherical, ball-shaped protrusion configured to engage the nest region.

13. The heat press of claim 1, wherein the first handle is configured to move, in response to user force, out of alignment with the upper assembly.

14. The heat press of claim 1, wherein the first handle is configured to facilitate at least one of operation and actuation of the heat press.

15. The heat press of claim 1, wherein the first handle is a forward-most portion of the heat press.

16. The heat press of claim 1, wherein the first handle is moveable relative to the heat plate of the upper assembly.

17. The heat press of claim 16, further comprising a position sensor, configured to detect a position of the first handle, and a controller coupled in control communication with the drive motor and the position sensor, wherein the controller is configured to receive the detected position of the first handle and modulate the drive motor, based on the detected position of the first handle, to exert a desired compressive force on the workpiece between the heat plate and the platen.

18. The heat press of claim 16, wherein operation of the drive motor is modulated in response to detected movement of the first handle.

19. A heat press comprising:
an upper assembly comprising a heat plate;
a lower assembly comprising a platen;
a base assembly interconnecting the upper assembly to the lower assembly;
a drive motor that is configured to move the upper assembly relative to the lower assembly;
a handle forming a front edge of the heat press;
a position sensor configured to detect a position of the handle; and
a controller coupled in control communication with the drive motor and the position sensor;
wherein:
   the heat press is configured to heat and compress, between the heat plate and the platen, a workpiece;
   the handle is moveable relative to the heat plate of the upper assembly; and
   the controller is configured to receive the detected position of the handle and modulate the drive motor, based on the detected position of the handle, to exert a desired compressive force on the workpiece between the heat plate and the platen.

20. The heat press of claim 19, wherein the heat plate is coupled to an upper housing via a gimbal structure comprising four spring-loaded anchors, wherein the four spring-loaded anchors are disposed around a central location of the heat plate and are configured to enable angling of the heat plate relative to the upper housing in response to a shape of a workpiece compressed between the heat plate and the platen.

\* \* \* \* \*